US 9,998,790 B1

United States Patent
Logan et al.

(10) Patent No.: US 9,998,790 B1
(45) Date of Patent: Jun. 12, 2018

(54) AUGMENTED REALITY CONTENT RECOMMENDATION

(71) Applicant: Rovi Guides, Inc., San Carlos, CA (US)

(72) Inventors: Jonathan A. Logan, Mountain View, CA (US); Alexander W. Liston, Menlo Park, CA (US); William L. Thomas, Evergreen, CO (US); Gabriel C. Dalbec, Morgan Hill, CA (US); Margret B. Schmidt, Redwood City, CA (US); Mathew C. Burns, Dublin, CA (US); Ajay Kumar Gupta, Andover, MA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days. days.

(21) Appl. No.: 15/474,726

(22) Filed: Mar. 30, 2017

(51) Int. Cl.
| | |
|---|---|
| *H04N 21/234* | (2011.01) |
| *H04N 21/466* | (2011.01) |
| *H04N 21/45* | (2011.01) |
| *H04N 21/472* | (2011.01) |
| *H04N 21/482* | (2011.01) |
| *H04N 21/475* | (2011.01) |

(52) U.S. Cl.
CPC ..... *H04N 21/4668* (2013.01); *H04N 21/4524* (2013.01); *H04N 21/4532* (2013.01); *H04N 21/47214* (2013.01); *H04N 21/23418* (2013.01); *H04N 21/4756* (2013.01); *H04N 21/4821* (2013.01)

(58) Field of Classification Search
None
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 9,317,113 B1 * | 4/2016 | Karakotsios | G06F 3/013 |
| 2002/0174430 A1 | 11/2002 | Ellis et al. | |
| 2005/0251827 A1 | 11/2005 | Ellis et al. | |
| 2010/0153885 A1 | 6/2010 | Yates | |
| 2013/0044128 A1 | 2/2013 | Liu et al. | |

(Continued)

*Primary Examiner* — Pankaj Kumar
*Assistant Examiner* — Charles N Hicks
(74) *Attorney, Agent, or Firm* — Haley Guiliano LLP

(57) ABSTRACT

Methods and systems are described herein for providing streamlined access to media assets of interest to a user. The method includes determining that a supplemental viewing device, through which a user views a field of view, is directed at a first field of view. The method further involves detecting that the supplemental viewing device is now directed at a second field of view, and determining that a media consumption device is within the second field of view. A first media asset of interest to the user that is available for consumption via the media consumption device is identified, and the supplemental viewing device generates a visual indication in the second field of view. The visual indication indicates that the first media asset is available for consumption via the media consumption device, and the visual indication tracks a location of the media consumption device in the second field of view.

20 Claims, 9 Drawing Sheets

(56) References Cited

U.S. PATENT DOCUMENTS

2013/0083173 A1* 4/2013 Geisner .................. G06F 3/013
                                                      348/51
2013/0260360 A1* 10/2013 Baurmann ................ G06F 3/14
                                                      434/365

* cited by examiner

AUGMENTED REALITY CONTENT RECOMMENDATION

BACKGROUND

Users typically have to interact with multiple media devices to determine whether there is anything available through those media devices that may be of interest. For example, a user will have to turn on a television and view the listings in a guide to determine what is available. With the increasing amount of content available to users, and the increasing number of media devices and media sources available to a single user, it has become onerous for users to keep track of what media of interest is available, or through which source(s) they can consume the media. Furthermore, even if a user is aware that particular media content of interest is available or will become available, the user may have forgotten about the media content by the time that the media content becomes available, or by the time that it would be convenient for the user to consume the media content. For example, a user who has lost track of time may miss the start of a live sports game that the user was interested in watching. As another example, new media may be made available for streaming via a media device, but if the user is not interacting with the media device, the user would not be aware that the new media has been made available.

SUMMARY

Accordingly, systems and methods are disclosed herein for providing streamlined access to media assets of interest to a user available from various user devices using a supplemental viewing device, such as an augmented reality device or virtual reality device worn by a user. A media asset of interest may be available via a media device in the visual field of the user. For example, the user may be standing in a living room that has multiple media devices, such as a television and a tablet computer. After determining that the television and the tablet computer are in the user's field of view, the supplemental viewing device may identify any media assets available via the television and/or the tablet computer that the user would be interested in viewing and generate a visual indication visible to the user indicating that a media asset of interest is available. For example, the supplemental viewing device may determine that the user may be interested in viewing a live broadcast of the Oscars, which is available on the television, and generate a visual indication that the broadcast of the Oscars is available for viewing. The supplemental viewing device may highlight the television using, e.g., a border or overlay that draws the television to the user's attention, and may display words, images, and/or audio cues indicating availability of a media asset of interest.

In some aspects, a media guidance application may be used to provide, using a supplemental viewing device, streamlined access to media assets that are of interest to a user, and that are available from various user devices. It should be noted that some or all methods and systems described herein may be performed outside of a media guidance application with one or more software modules and/or one or more hardware components. Specifically, the media guidance application residing on a supplemental viewing device, through which a user wearing the supplemental viewing device views a field of view, may receive a first image of a first field of view. For example, the supplemental viewing device worn by the user may receive an image of the user's living room, which includes a lamp and a table. This may be the same image that the user is viewing through the supplemental viewing device.

The media guidance application may detect a first plurality of objects within the first image of the first field of view. For example, the supplemental viewing device may transfer the image of the user's living room to a media guidance application, which may be running on the supplemental viewing device or external circuitry. The media guidance application, having received the image of the user's living room, may detect the lamp and the table within the image.

The media guidance application may determine that the detected first plurality of objects does not include any media consumption device. For example, the media guidance application may determine that the lamp and the table are not media consumption devices, and since there are no other detected objects, the detected objects do not include any media consumption device.

The supplemental viewing device may receive a second image. For example, the supplemental viewing device may receive an image of a different view of the user's living room, which includes the lamp that was detected previously, along with a different table upon which sits a television. The user may have turned his head towards the direction of the television, and this may be the image that the user is now viewing through the supplemental viewing device.

The media guidance application may compare the first image with the second image. As with the first image, the supplemental viewing device may transfer the second image of the user's living room to the media guidance application running on the supplemental viewing device or external circuitry. For example, the media guidance application, having received the second image of the user's living room, may compare the first image with the second image to determine whether the image has changed.

The media guidance application may detect, based on the comparing, that the supplemental viewing device is now directed at a second field of view that is different from the first field of view. For example, by comparing the first image of the living room, which includes a table and a lamp, with the second image of the living room, which includes the same lamp along with a different table and a television, the media guidance application detects that the supplemental viewing device is now directed at a second field of view that is different from the first field of view.

The media guidance application may detect a second plurality of objects within the second field of view. For example, the media guidance application may detect the lamp, the second table, and the television within the second image.

The media guidance application may, when detecting a second plurality of objects within the second field of view, use an image recognition algorithm to analyze the second image to identify a plurality of sub-images, each of which corresponds to an object within the first image, and transmit the plurality of sub-images to a database. Detecting the second plurality of objects may further involve receiving, from the database, a plurality of object identifiers identifying the second plurality of objects, each object identifier corresponding to a respective sub-image of the plurality of sub-images, and storing the received plurality of object identifiers. For example, the media guidance application may include an image recognition algorithm that analyzes the second image to identify a sub-image corresponding to the lamp, a sub-image corresponding to the television, and a sub-image corresponding to the table. The media guidance application may transmit sub-images corresponding to the lamp, the television, and the table to a database that stores information correlating sub-images of various objects with identifiers of the objects. The media guidance application may receive from the database object identifiers that identify the lamp, television, and table. For example, the object identifiers may include serial numbers or other data codes. The media guidance application may store the received object identifiers identifying the lamp, television, and table, e.g., in local memory.

The media guidance application may determine, based on the detected second plurality of objects within the second field of view, that a media consumption device that was not within the first field of view is within the second field of view. For example, the media guidance application may determine that the television is a media consumption device that is within the second field of view but was not within the first field of view.

Determining that a media consumption device that was not within the first field of view is within the second field of view may involve retrieving the plurality of object identifiers and transmitting a request for object metadata describing each of the second plurality of objects. The request may include the plurality of object identifiers. Determining that a media consumption device that was not within the first field of view is within the second field of view may additionally or alternatively involve receiving object metadata describing each of the second plurality of objects, identifying a type corresponding to each object of the second plurality of objects based on the received metadata, and comparing, for each of the plurality of objects, the type corresponding to each object with a plurality of types each corresponding to a known media consumption device. Based on comparing, for each of the plurality of objects, the type corresponding to each object with the plurality of types, the media guidance application may determine that the second plurality of objects includes the media consumption device.

For example, the media guidance application may retrieve the stored object identifiers for the lamp, television, and table, and transmit a request for object metadata describing the lamp, television, and table. The request may include the object identifiers, which may be, e.g., serial numbers or other data codes. The media guidance application may receive object metadata describing the lamp, television, and table. For example, the metadata describing the table may include the brand name "IKEA," the model name "LACK," the color "brown," and the type "table." The metadata describing the television may include the brand "SAMSUNG," the model number "5200," and the type "Smart TV." In some embodiments, the metadata describing the television may further include service information, such as streaming services "HULU" and "NETFLIX," and broadcast service "SPECTRUM," and additional information describing available channels or other types of subscribed services. The media guidance application may identify a type corresponding to the lamp, television, and table objects based on the received metadata, such as the types "Lamp," "Living Room Smart TV," and "Table." The media guidance application may compare, for the lamp, television, and table, the type corresponding to each object ("Lamp," "Living Room Smart TV," and "Table") with a plurality of types each corresponding to a known media consumption device, such as "Living Room Smart TV," "IPAD," "Bedroom TV," etc. Based on the comparison, the media guidance application may determine that the second plurality of objects—the lamp, television, and table—includes the television.

The media guidance application may, in response to determining that the media consumption device that was not within the first field of view is within the second field of view, transmit a request for information about media available for consumption via the media consumption device. The request may include data identifying the media consumption device. For example, in response to determining that the television, which was not within the first field of view, is within the second field of view, the media guidance application may transmit a request for information about the media available for consumption via the television. The request may include data identifying the television, such as a serial number or code that corresponds to the television and/or a serial number or code that corresponds to services available via the television (e.g., cable services, satellite services, streaming services, etc.).

The media guidance application may determine, based on information received in response to the request, a first media asset of interest to the user that is available for consumption via the media consumption device. For example, the media guidance application may receive information identifying programs that are currently being broadcast to the television, and the media guidance application may determine that a current broadcast of the Oscars is available for consumption via the television and would be of interest to the user.

Determining a first media asset of interest to the user that is available for consumption via the media consumption device may involve receiving, in response to the request, metadata describing a plurality of media assets available for consumption via the media consumption device. Determining the first media asset of interest may additionally or alternatively involve retrieving a user profile that is associated with the supplemental viewing device and that includes a set of user preferences. Determining the first media asset of interest may additionally or alternatively involve comparing the set of user preferences with the metadata describing the plurality of media assets available via the media consumption device, and identifying, based on comparing the set of user preferences with the metadata describing the plurality of media assets available via the media consumption device, the first media asset of interest to the user. The metadata describing the first media asset of interest to the user may match at least one user preference of the set of user preferences.

For example, the media guidance application may receive, in response to the request for information about the media available for consumption via the television, metadata describing all broadcast programs currently available to view on the television. The media guidance application may also retrieve a user profile that is associated with the supplemental viewing device and that includes a set of user preferences, such as interests in movies, game shows, the New York Jets, and award shows. The media guidance application may compare the set of user preferences, which includes the user's interests in movies, game shows, the New York Jets, and award shows, with the metadata describing broadcast programs currently available to view on the television, and identify, based on the comparison, that the Oscars ceremony is of interest to the user. The metadata describing the Oscars ceremony may indicate that it is about movies, is live, includes Jimmy Kimmel, and is an awards show. In this example, the metadata matches two user preferences (movies, award shows) of the set of user preferences.

The supplemental viewing device may generate a visual indication in the second field of view. The visual indication may indicate that the first media asset is available for consumption via the media consumption device, and the visual indication may track a location of the media consumption device in the second field of view. For example, the supplemental viewing device may generate for display the statement "The Oscars are live now!" such that it appears to the user to be on the television screen to indicate that the Oscars are available for consumption via the television. The display of the statement "The Oscars are live now" may track the location of the television in the field of view seen through the supplemental viewing device. For example, as the user's head moves but keeps the television within the field of view, the display of "The Oscars are live now!" may move relative to the frame of the field of view of the supplemental viewing device, but not move relative to the location of the television.

The media guidance application may detect that the supplemental viewing device is now directed at a third field of view and may obtain a third image of the third field of view. The media guidance application may analyze the contents of the obtained third image to determine that the media consumption device is within the third field of view, and update the location of the visual indication such that the visual indication appears to the user to track the location of the media consumption device in the third field of view. For example, the media guidance application may detect that the supplemental viewing device is directed at a third field of view that still includes the lamp and the television, but these objects have shifted to the right with respect to the frame of the field of view. The media guidance application may obtain an image of the third field of view and may analyze the contents of the third image to determine that the television is within the third field of view. The media guidance application updates the location of "The Oscars are live now!" generated for display to the user such that this statement appears to the user to track the location of the television in the third field of view.

The media guidance application may determine that a second media consumption device that was not within the first field of view is within the second field of view and may determine a second media asset of interest to the user that is available for consumption via the second media consumption device. The second media asset may be of less interest to the user than the first media asset. The supplemental viewing device may generate a second visual indication in the second field of view. The second visual indication may indicate that the second media asset is available for consumption via the second media consumption device, and the visual indication that indicates that the first media asset is available for consumption may be more visually prominent than the second visual indication.

For example, the media guidance application may determine that a tablet computer that was not in the first field of view is in the second field of view, along with the television. The media guidance application may determine that the latest episode of "Last Week Tonight" is of interest to the user and available for streaming on the tablet computer. In this example, a live football game between the New York Jets and the New England Patriots is currently available for viewing on the television. "Last Week Tonight" may be of less interest to the user than the football game because, for example, the user prefers watching live events to non-live events, or because the user prefers watching football games to comedies. The supplemental viewing device may generate a football icon in front of the television as a first visual indication for the football game, and a comedy icon in front of the tablet as a second visual indication for "Last Week Tonight." The football icon may be more visually prominent than the comedy icon based on, e.g., color, size, brightness, or movement.

The media guidance application may determine a first media type corresponding to the first media asset of interest to the user, and a second media type corresponding to the second media of asset of interest to the user. The second media type may be different from the first media type. The media guidance application may select a first visual property for the visual indication based on the first media asset type, and may select a second visual property for the second visual indication based on the second media asset type. The second visual property may be different from the first visual property. The media guidance application may generate the visual indication and the second visual indication according to the selected first visual property and the selected second visual property.

For example, the media guidance application may determine that the New York Jets football game corresponds to a sports media type, and that "Last Week Tonight" corresponds to a comedy media type. The media guidance application may select one icon shape, such as a football, based on the sports media type, and a different icon shape, such as a comedy mask, based on the comedy media type. The media guidance application may generate the visual indication for the football game according to the selected football icon shape and the visual indication for "Last Week Tonight" based on the comedy mask icon shape.

The media guidance application may determine that the location of the media consumption device in the second field of view is at a perimeter of the second field of view and may detect that the supplemental viewing device is now directed at a third field of view. The media guidance application may determine that the location of the media consumption device is not at the perimeter of the third field of view and may modify the visual indication to identify the first media asset of interest to the user. For example, the media guidance application may determine that the location of the television in the second field of view is at the perimeter of the second field of view, i.e., near the frame of the field of view. The media guidance application may detect that the supplemental viewing device is now directed at a third field of view, in which the television is now near the center of the third field of view. The media guidance application may determine that the location of the television is not at the perimeter of the third field of view, and may modify the visual indication so that information identifying the first media asset of interest is displayed. For example, when the location of the television is at the perimeter, the visual indication may cause the television to appear highlighted or glowing. When the location of the television is not at the perimeter, the visual indication may include the statement "The Oscars are live now!"

The media guidance application may store data defining a first predefined surface in a physical space accessible to the user and detect that the supplemental viewing device is now directed at a third field of view. The media guidance application may obtain a third image of the third field of view and determine, based on the contents of the third image, that the third field of view includes the first predefined surface. In response to the media guidance application determining that the third field of view includes the first predefined surface, the supplemental viewing device may generate a display of information such that the information appears to the user to be displayed on the first predefined surface.

For example, the media guidance data may store data that defines a blank section of a wall in the user's living room. The data may define the section of the wall by one or more dimensions, directions, and/or surrounding objects. The media guidance application may detect that the supplemental viewing device is directed at a third field of view, obtain a third image of the third field of view, and determine, based on the third image, that the third field of view includes the predefined surface. For example, the third image may include the predefined surface and surrounding furniture that is known to border the predefined surface. In response to the media guidance application determining that the third field of view includes the predefined surface, the supplemental viewing device may generate a display of information, such as a list of recommended media assets that are currently available for viewing, such that the information appears to the user to be displayed on the first predefined surface.

In some embodiments, the media guidance application may receive a user input indicating a request to display the first media asset of interest to the user, and, in response to receiving the user input, the supplemental viewing device may display the first media asset of interest to the user such that the first media asset appears to the user to be displayed on the first predefined surface. For example, rather than view the Oscars ceremony on the television, the user may direct his field of vision to the predefined area of the wall and the supplemental viewing device may generate for display the Oscars ceremony such that it appears to be displayed on the wall. This can make the Oscars ceremony appear to the viewer larger than it would appear on the television, and, depending on the arrangement of the supplemental viewing device, this can give the user a private view of the Oscars ceremony.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are disclosed herein for providing streamlined access to media assets of interest to a user available from various user devices using a supplemental viewing device, such as an augmented reality device or virtual reality device worn by a user. A media asset of interest may be available via a media device in the visual field of the user. For example, the user may be standing in a living room that has multiple media devices, such as a television and a tablet computer. After determining that the television and the tablet computer are in the user's field of view, the supplemental viewing device may identify any media assets available via the television and/or the tablet computer that the user would be interested in consuming and generate a visual indication visible to the user indicating that a media asset of interest is available. For example, the supplemental viewing device may determine that the user may be interested in viewing a live broadcast of the Oscars, which is available on the television, and may generate a visual indication that the broadcast of the Oscars is available for viewing. The supplemental viewing device may highlight the television using, e.g., a border or overlay that draws the television to the user's attention, and may display words, images, and/or audio cues indicating availability of a media asset of interest.

Figure 1:
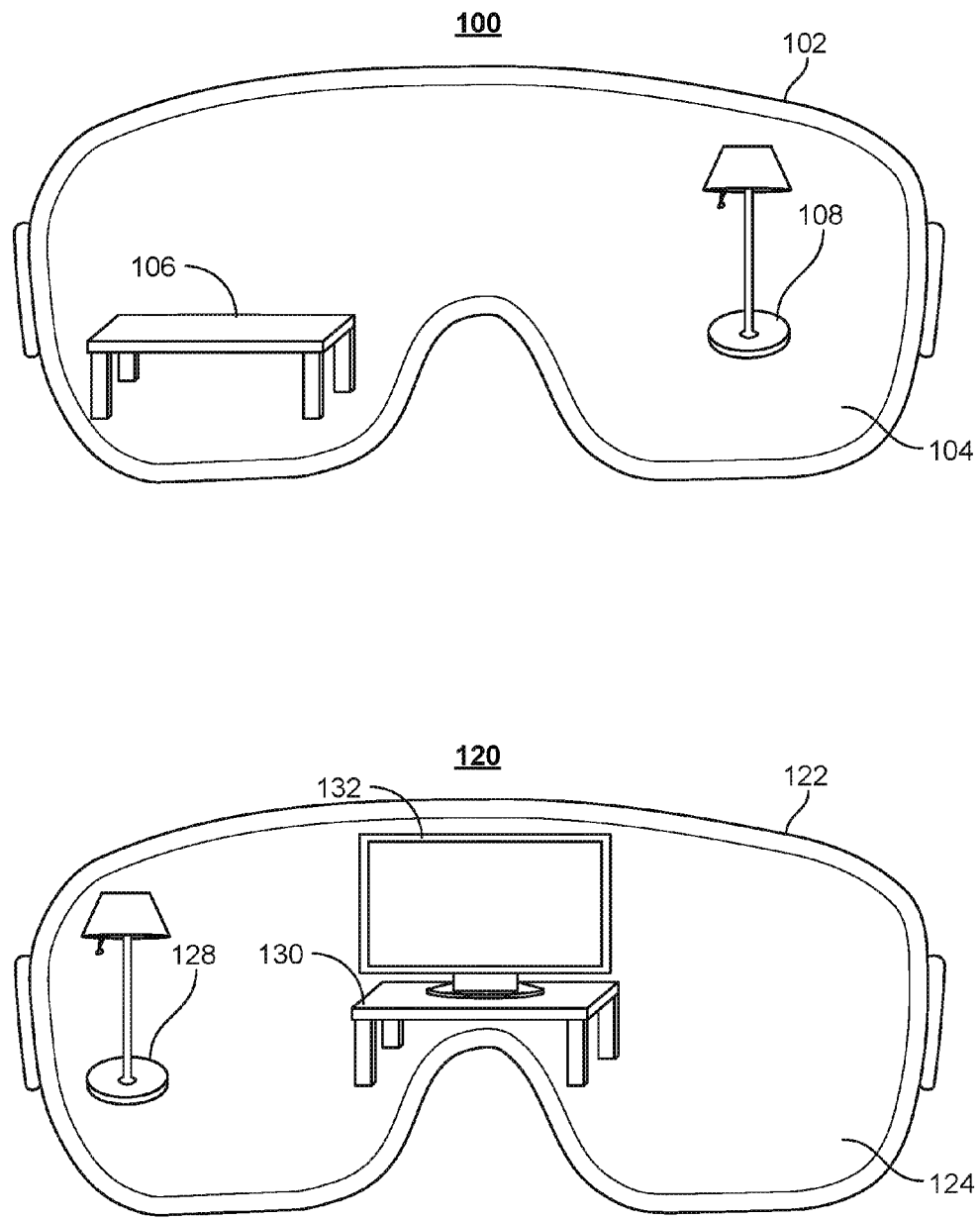
FIG. 1 shows an illustrative example of a supplemental viewing device providing streamlined access to media assets that are of interest to a user, and that are available from various media consumption devices, in accordance with some embodiments of the disclosure.
Figure 1:
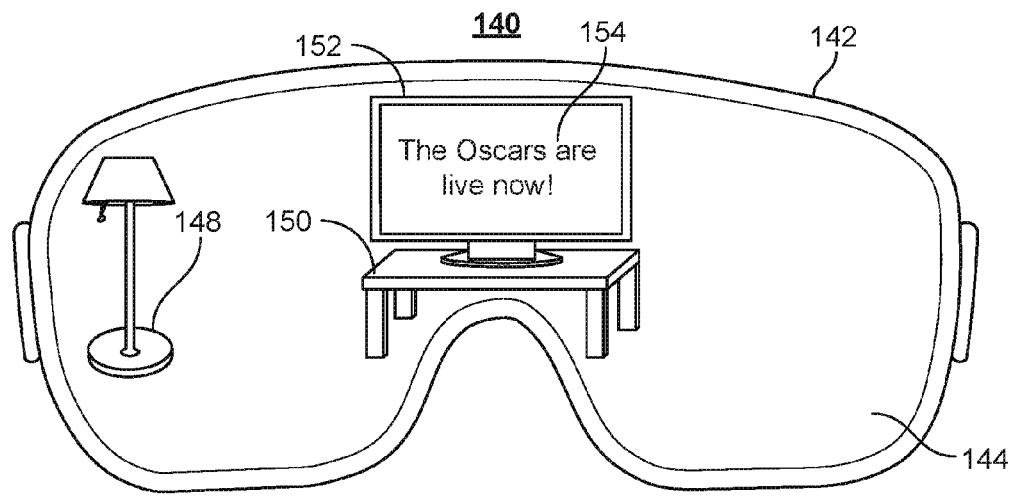
Figure 1:
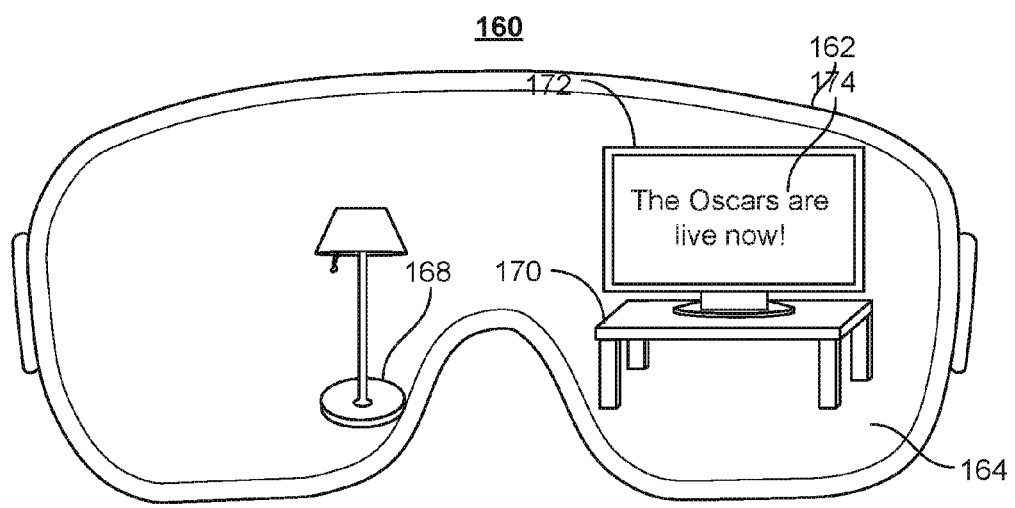

FIG. 1 shows an illustrative example of a supplemental viewing device providing a media asset recommendation, in accordance with some embodiments of the disclosure. FIG. 1 includes four images (images 100, 120, 140, and 160) that show the view of a user through a supplemental viewing device (102, 122, 142, and 162). As the user's view moves through a room, the images viewed through the supplemental viewing device 102, 122, 142, and 162 may change, as illustrated in the progression of the images 100, 120, 140, and 160.

The supplemental viewing device may be a pair of glasses, goggles, or other headwear. The user may view a field of view through the supplemental viewing device. As referred to herein, a "field of view" of a user refers to an area that a user can perceive with said user's sense of sight. A viewing portion of the supplemental viewing device may be transparent or partially transparent, such that the user is able to see the field of view directly through the supplemental viewing device. Alternatively or additionally, the supplemental viewing device may provide an image of the user's environment on a display screen. Objects that are behind a user are not in a field of view of the user, as the user cannot see the objects. The supplemental viewing device may modify images, as perceived by the user, within the field of view.

As referred to herein, "headwear" refers to any object that may be worn on the head of the user. For example, headwear may be a hat, helmet, glasses, goggles, etc. In some embodiments, headwear may include a viewing area, such as a pair of glasses or goggles, through which a user is able to see the field of view (e.g., a lens of the glasses or goggles through which a user can see other objects, or a viewing area). The lens may include a layer, such as an LCD layer, configured to augment the colors perceived by the user without permanently obstructing the field of view of the user, such that the user can perceive objects in his/her environment. As referred to herein, "augment" may mean to visually modify light. For example, the media guidance application may augment a color in the field of view of a user by changing the color perceived by a user at the location of the color. For example, the supplemental viewing device may include a small projector configured to project images on the lens of the second device, without permanently obstructing the view of the user. The user may wear a supplemental viewing device and may see objects through the glass of the goggles (i.e., viewing area). A media guidance application may instruct the projector to project a color on the lens of the goggles, such that the field of view of the user is augmented as the user now perceives the color as a part of his or her field of view.

In some embodiments, the viewing area of the supplemental viewing device may include a suspended particle layer. For example, the supplemental viewing device may include a pair of goggles. The glass of the goggles may include multiple layers; one layer may include suspended particles such that the particles in the layer change their orientation based on a voltage applied, by the media guidance application, across the layer. The orientation of the particles defines a light transmittance for a portion of the viewing area corresponding to the portion of the suspended particle layer. As referred to herein, a "light transmittance" is a value representative of the amount of light that can pass through an object. For example, an object that is perfectly clear (i.e., all light can pass) may have a high light transmittance (e.g., a light transmittance of 100%). As another example, an object that is perfectly opaque may have a low light transmittance (e.g., a light transmittance of 0%). The media guidance application may adjust the voltage across portions of the suspended particle layer of the supplemental viewing device to adjust the light transmittance of the portions of the viewing area. In this way, the supplemental viewing device may modify the appearance of the field of view as perceived by the user.

In some embodiments, the supplemental viewing device may include a pair of glasses. The viewing area of the glasses may include multiple layers; one layer may be a liquid crystal layer or an electrochromic layer. The media guidance application may be configured to adjust the voltage across portions of the liquid crystal layer, or the charges applied to the electrochromic layer, in order to modify the appearance of the field of view as perceived by the user.

In some embodiments, the supplemental viewing device may provide an image of the user's environment on a display screen. The supplemental viewing device may include a camera for capturing an image and a display screen for displaying that image to the user. The supplemental viewing device may modify the captured image such that the field of view is modified relative to the user's actual environment.

Image 100 of FIG. 1 illustrates a first field of view 104 viewed through a supplemental viewing device 102. In some embodiments, a media guidance application residing on the supplemental viewing device 102 may receive a first image of a first field of view. For example, the supplemental viewing device 102 worn by the user may receive an image of the user's living room, which may include a lamp 108 and a table 106. This may be the same image that the user is viewing through the supplemental viewing device. For example, the supplemental viewing device 102 may include a camera for capturing an image of the field of view 104. As discussed above, the field of view 104 may be directly perceived by the user because the supplemental viewing device 102 includes a transparent layer. Alternatively, the field of view 104 may be reproduced by the supplemental viewing device 102, which, as discussed above, may include a display screen.

The media guidance application may detect a first plurality of objects 106, 108 within the first image of the first field of view 104. For example, the supplemental viewing device 102 may transfer the image of the user's living room including table 106 and lamp 108 to a media guidance application, which may reside, at least partially, on the supplemental viewing device and/or partially on external circuitry. For example, the supplemental viewing device may be in communication with an external computing device via a wired or wireless (e.g., BLUETOOTH, WI-FI, LTE, etc.) connection, and the external computing device may be executing the media guidance application. Alternatively or additionally, the media guidance application may be executed, at least in part, on control circuitry within the supplemental viewing device. Options for the implementation of a media guidance application are discussed further with respect to FIGS. 5 and 6. The media guidance application, having received the image of the portion of the user's living room within the field of view 104, may detect lamp 108 and table 106 within the image. For example, the media guidance application may use an image recognition algorithm to analyze the image to identify a plurality of sub-images (e.g., one sub-image for the table 106 and one sub-image for the lamp 108), and transfer the plurality of sub-images to a database. The media guidance application may receive from the database an object identifier identifying lamp 108 and an object identifier identifying table 106, and store these received plurality of object identifiers.

The media guidance application determines that the detected first plurality of objects does not include any media consumption device. For example, the media guidance application may determine that lamp 108 and table 106 are not media consumption devices. Since there are no other detected objects, the detected objects 106 and 108 do not include any media consumption device.

In some embodiments, the media guidance application may determine that the detected first plurality of objects does not include any media consumption device by retrieving the object identifiers for table 106 lamp 108 and transmitting a request for object metadata describing table 106 and lamp 108. The request may include the object identifiers. The media guidance application may receive object metadata describing table 106 and lamp 108, and, based on the received metadata, identify a type corresponding to table 106 and lamp 108. For example, table 106 may be type "Table" or "Furniture", and lamp 108 may be type "Lamp" or type "Lighting." The media guidance application may compare the object types (e.g., "Table" and "Lamp") with object types that correspond to known media consumption devices (e.g., "Television" and "Tablet"). Based on the comparison, the media guidance application may determine that the objects (e.g., lamp 108 and table 106) do not include a media consumption device.

The media guidance application residing on the supplemental viewing device may receive a second image. Image 120 of FIG. 1 illustrates the media guidance application residing on the supplemental viewing device 122 receiving a second image associated with field of view 124. For example, the supplemental viewing device 122 may receive an image of a different view of the user's living room; this field of view 124 includes the lamp that was detected previously (lamp 108 in image 100 and lamp 128 in image 120), along with a different table 130 upon which sits a television 132. The user may have turned his head towards the direction of the television, and this may be the image that the user is now viewing through the supplemental viewing device 122.

The media guidance application may compare the first image, which corresponds to field of view 104, with the second image, which corresponds to field of view 124. As with the first image, the supplemental viewing device 122 may transfer the second image of the field of view 124 of the user's living room to the media guidance application residing on the supplemental viewing device or external circuitry. For example, the media guidance application, having received the second image of the field of view 124 of the user's living room, may compare the first image of the field of view 104 to the second image of the field of view 124 to determine whether the image has changed.

The media guidance application may detect, based on the comparing, that the supplemental viewing device is now directed at a second field of view that is different from the first field of view. For example, by comparing the first image of the field of view 104 of the living room, which includes a table 106 and a lamp 108, with the second image of the field of view 124 of the living room, which includes the same lamp 128 along with a different table 130 and a television 132, the media guidance application may detect that the supplemental viewing device is now directed at a second field of view 124 that is different from the first field of view 104.

The media guidance application may detect a second plurality of objects within the second field of view. For example, the media guidance application may detect the lamp 108, the second table 130, and the television 132 within the second image.

In some embodiments, the media guidance application may detect a second plurality of objects (e.g., objects 128, 130, and 132) within the second field of view 124 by using an image recognition algorithm to analyze the second image to identify a plurality of sub-images, each of which corresponds to an object within the first image, and transmitting the plurality of sub-images to a database. Additionally or alternatively, detecting the second plurality of objects (e.g., objects 128, 130, and 132) may involve receiving, from the database, a plurality of object identifiers identifying the second plurality of objects (e.g., objects 128, 130, and 132), each object identifier corresponding to a respective sub-image of the plurality of sub-images, and storing the received plurality of object identifiers. For example, the media guidance application may include an image recognition algorithm that analyzes the second image to identify a sub-image corresponding to the lamp 128, a sub-image corresponding to the television 132, and a sub-image corresponding to the table 130. For example, the image recognition algorithm may identify outlines or boundaries of sub-images by locating edges, color changes, texture changes, shading changes, lines, or other visual cues. The media guidance application may transmit the sub-images of the lamp, television, and table to a database that stores information correlating sub-images of various objects to identifiers of the objects. The media guidance application may receive from the database object identifiers that identify the lamp 128, television 132, and table 130. For example, the object identifiers may include serial numbers or other data codes. The media guidance application may store the received object identifiers identifying the lamp 128, television 132, and table 130, e.g., in local memory.

The media guidance application may determine, based on the detected second plurality of objects (e.g., objects 128, 130, and 132) within the second field of view 124, that a media consumption device that was not within the first field of view 104 is within the second field of view 124. For example, the media guidance application may determine that the television 132 is a media consumption device that is within the second field of view 124 but was not within the first field of view 104.

In some embodiments, the media guidance application may, when determining that a media consumption device that was not within the first field of view 104 is within the second field of view 124, retrieve the plurality of object identifiers and transmitting a request for object metadata describing each of the second plurality of objects (e.g., objects 128, 130, and 132). The request may include the plurality of object identifiers. The media guidance application may receive object metadata describing each of the second plurality of objects (e.g., objects 128, 130, and 132); identify a type corresponding to each object of the second plurality of objects (e.g., objects 128, 130, and 132) based on the received metadata; and compare, for each of the plurality of objects (e.g., objects 128, 130, and 132), the type corresponding to each object with a plurality of types each corresponding to a known media consumption device. Based on this comparison, the media guidance application may determine that the second plurality of objects (e.g., objects 128, 130, and 132) includes the media consumption device, in this case, television 132.

For example, the media guidance application may retrieve the stored object identifiers for the lamp 128, television 132, and table 130, and transmit a request for object metadata describing the lamp 128, television 132, and table 130. The request may include the object identifiers, which may be, e.g., serial numbers or other data codes. The media guidance application may receive object metadata describing the lamp 128, television 132, and table 130. For example, the metadata may be stored in a data structure that includes various fields used to describe an object. Data structure fields may include object type, object size, object color, object brand, etc. The fields for an object may be based on the type of object. For example, if the object type is "television," the data structure may include fields for brand name, model number, and/or model year. The data structure for an object may include a default set of fields, and any additional optional fields associated with the object type. For example, the metadata describing the table 130 may include the brand name "IKEA," the model name "LACK," the color "brown," and the type "table." The metadata describing the television 132 may include the brand "SAMSUNG," the model number "5200," and the type "Smart TV." In some embodiments, the metadata describing the television may further include media service information, such as information about streaming services such as HULU, AMAZON, NETFLIX, and SPOTIFY, cable or satellite broadcast service, antenna feeds, locally and/or remotely stored media, or any other types of media or services available via the media consumption device. In some embodiments, the metadata may include information identifying the user or users of the media services. The metadata may include information identifying media available via the services, such as received channels, subscribed channels, purchased media, media available for sale, etc.

The database may be specific to a particular user's environment. For example, the database may include entries for many or most of the objects within a user's home. The entries may include information specific to the arrangement of the home; for example, the database may indicate that television 132 is a Smart TV in the user's living room, has the object type "Living Room Smart TV." Alternatively or additionally, the database may be a general database that can be used by users from different environments. The database may include images that can be used to identify most or all objects that appear in residences or other environments.

The media guidance application may identify an object type corresponding to the lamp 128, television 132, and table 130 objects based on the received metadata, such as the types "Lamp," "Living Room Smart TV," and "Table." If the metadata is arranged as a data structure having multiple fields, as described above, the media guidance application may, for each object, extract the data for the object type field of the data structure. For example, the media guidance application may extract the object type (e.g., "Living Room Smart TV") of television 132 from the object type data field of the data structure of metadata describing television 132. The media guidance application may compare, for the lamp 128, television 132, and table 130, the extracted object type corresponding to each object ("Lamp," "Living Room Smart TV," and "Table") with a plurality of types each corresponding to a known media consumption device, such as "Living Room Smart TV," "IPAD," "Bedroom TV," etc. Metadata describing known media consumption devices may be stored in a similar data structure to the object data structure described above. Based on the comparison, the media guidance application may determine that the second plurality of objects—the lamp 128, television 132, and table 130—includes the television 130.

The media guidance application may, in response to determining that the media consumption device (e.g., media consumption device 132) that was not within the first field of view (e.g., field of view 104) is within the second field of view (e.g., field of view) 124, transmit a request for information about media available for consumption via the media consumption device. The request may include data identifying the media consumption device. For example, in response to determining that the television 130, which was not within the first field of view 104, is within the second field of view 124, the media guidance application may transmit a request for information about the media available for consumption via the television 130. The request may include data identifying the television 130, such as a serial number or code that corresponds to the television and/or a serial number or code that corresponds to services available via the television (e.g., cable services, satellite services, streaming services, etc.).

The media guidance application may determine, based on information received in response to the request, a first media asset of interest to the user that is available for consumption via the media consumption device. For example, the media guidance application may receive information identifying programs that are currently being broadcast to the television 130, and the media guidance application may determine that a current broadcast of the Oscars is available for consumption via the television 130 and would be of interest to the user. The media guidance application may transmit a request for information identifying currently broadcast programs from the television 130, or may transmit a request for this information to a remote server. The media guidance application may receive the information responsive to this request.

As another example, the media guidance application may receive information identifying streaming media assets that have recently been released for consumption. The media guidance application may transmit a request for information identifying new movies, shows, or seasons of shows that have been released via a streaming service, such as NETFLIX or HULU. The media guidance application may receive information identifying new movies, shows, or seasons of shows (e.g., information identifying season three of "Unbreakable Kimmy Schmidt" and the movie "Frozen," if these have recently become available) responsive to this request. As another example, the media guidance application may receive information identifying programs that are not newly available, but that the user may be interested in viewing. For example, the media guidance application may receive information identifying unviewed episodes in a series that the user has recorded, viewed, or streamed in the past. As another example, the media guidance application may receive information identifying all programs that are available to the user, and the media guidance application may process this information, as discussed further below, to identify any program, new or old, that the user may be interested in watching.

In some embodiments, the media guidance application may determine a first media asset of interest to the user that is available for consumption via a media consumption device by taking the following actions. The media guidance application may receive, in response to the request, metadata describing a plurality of media assets available for consumption via the media consumption device. The media guidance application may retrieve a user profile that is associated with the supplemental viewing device and that includes a set of user preferences, and compare the set of user preferences with the metadata describing the plurality of media assets available via the media consumption device, and identify, based on comparing the set of user preferences with the metadata describing the plurality of media assets available via the media consumption device, the first media asset of interest to the user. The metadata describing the first media asset of interest to the user may match at least one user preference of the set of user preferences.

For example, the media guidance application may receive, in response to the request for information about the media available for consumption via the television 130, metadata describing all broadcast programs currently available to view on the television. Alternatively or additionally, the media guidance application may receive metadata describing media available for streaming, media that is locally or remotely stored, or otherwise available for consumption. In some embodiments, the metadata may include media that will become available in the future. The media guidance application may also retrieve a user profile that is associated with the supplemental viewing device and that includes a set of user preferences, such as the user's interests in movies, game shows, the New York Jets, and award shows. For example, the media guidance application may transmit a request for the user profile to local memory of the supplemental viewing device, or may transmit the request to a remote server. The media guidance application may receive the user profile responsive to this request. The media guidance application may compare the set of user preferences, which includes the user's interests in movies, game shows, the New York Jets, and award shows, with the metadata describing media (e.g., currently broadcast programs) available for consumption on the television 132, and identify, based on the comparison, that the Oscars ceremony is currently being broadcast and is of interest to the user. For example, the metadata describing the Oscars ceremony may indicate that it is about movies, is live, includes Jimmy Kimmel, and is an awards show. Thus, this metadata matches two user preferences (movies, award shows) of the set of user preferences.

In some embodiments, the media guidance application may consider additional factors in determining the first media asset of interest to the user that is available for consumption via the media consumption device. For example, the media guidance application may analyze the viewing history of the user to determine a media asset of interest based on the time of day and/or the day of the week. As another example, the media guidance application may identify one or more additional users who may also view a selected media asset, and the media guidance application may determine a first media asset of interest to the user and the one or more additional users. For example, if the media guidance application identifies that the user's child is in the same room as the user (e.g., based on voice recognition, facial recognition, user input identifying the child, etc.), the media guidance application may determine a first media asset that would be of interest to both the user and the user's child.

In some embodiments, to determine that a media asset is of interest to the user, the media guidance application may require that at least a threshold number, or a threshold proportion, of user preferences are met by the media asset. In some embodiments, the media guidance application may select the media asset that is of highest interest to the user. In some embodiments, the user may have selected particular media assets or types of media assets that are of interest for the media guidance application to identify. For example, the media guidance application may have received indications from the user that the user would like to watch live football games featuring the New York Jets. The media guidance application may receive data from multiple sources to determine a user's preferences. For example, the media guidance application may receive preference information from one or more subscribed services (e.g., streaming services, broadcast services, etc.), social media applications, fantasy sports applications, shopping services, online advertisers, demographic profile information, etc.

As illustrated in image 140 of FIG. 1, the media guidance application residing on the supplemental viewing device 142 may generate a visual indication (e.g., visual indication 154) in the second field of view (e.g., field of view 144). The second field of view 144 corresponds to the first field of view 124 of image 120, with the same lamp (128 and 148), television (132 and 152), and table (130 and 150). However, the second field of view 144 includes the visual indication 154 generated by the supplemental viewing device 152. The visual indication may indicate that the first media asset is available for consumption via the media consumption device, and the visual indication may track a location of the media consumption device in the second field of view. For example, as illustrated in image 140, the supplemental viewing device 142 may generate for display the statement "The Oscars are live now!" such that it appears to the user to be on the television screen to indicate that the Oscars are available for consumption via the television. Instead of, or in addition to, a text statement, the visual indication 154 may be or may include an image (e.g., an image with the words "The Oscars" that is scaled and/or skewed to fit the frame of the television 152), an icon, a highlight, a glow, or any other visual feature that draws the user's attention and/or provides information. Alternatively or in addition, if the supplemental viewing device includes one or more speakers, the media guidance application may play an audio indication (e.g., the statement "The Oscars are live on your television," or a tone or jingle) to the user. The display of the visual indication 154 (in FIG. 1, the statement "The Oscars are live now!") may track the location of the television 152 in the field of view 144 seen through the supplemental viewing device 142.

For example, as the user's head moves but keeps the television 152 within the field of view, the display of the visual indication 154 may move relative to the frame of the field of view of the supplemental viewing device, but not move relative to the location of the television. For example, image 160 shows the supplemental viewing device 162 with a field of view 164 that includes the same lamp (148 and 168), television (152 and 172), and table (150 and 170) as in field of view 144. However, relative to the frame of the fields of view 144 and 164, the objects 168, 170, and 172 have moved to the right. The location of the visual indication 174 tracked the location of the television 172, so that it still appears to the user to be on the screen of the television 172. To create this effect, the media guidance application may continually track the locations of objects 148, 150, and 152 relative to the field of view. To track the location of the television 152, the media guidance application may continually obtain images of the field of view, and detect the objects within each obtained image as described above. The media guidance application may compare a previous location of the television 152 within a first obtained image, e.g., an image of field of view 144, to a location of the television 172 within a subsequently obtained image, e.g., an image of field of view 164. The media guidance application may determine that the location of the television 172 has changed, and in response to this determination, generate the visual indication 174 in the new location of the television 172 such that the visual indication 174 tracks the location of the television 172. Alternatively, if the media guidance application determines that the location of the television has not changed from one image to a subsequently obtained image, the media guidance application may continue displaying the visual indication at the same location relative to the field of view.

In some embodiments, the media guidance application may identify a media consumption device that is located outside of the field of view 144, and through which a media asset of interest is available for consumption. For example, the camera of the supplemental viewing device may receive an image of an area outside of the field of view, and, based on this image, the media guidance application may identify media consumption devices in the proximity of the user but outside the field of view 144 using the image recognition process described above. The media guidance application may generate for the user a visual and/or audio indication that a media asset of interest is available on a media consumption device outside the field of view 144. For example, the media guidance application may generate for display within the field of view 144 an arrow that points in the direction of the media consumption device that is outside the field of view 144. As another example, if the supplemental viewing device includes one or more speakers, the media guidance application may generate an audio prompt such as "Turn your head left to see the Oscars!" Both a visual indication and audio indications may be provided together, either in sequence or simultaneously.

In some embodiments, the media guidance application may detect that the supplemental viewing device is now directed at a third field of view and may obtain a third image of the third field of view. The media guidance application may analyze the contents of the obtained third image to determine that the media consumption device is within the third field of view, and update the location of the visual indication such that the visual indication appears to the user to track the location of the media consumption device in the third field of view. For example, the media guidance application may detect that the supplemental viewing device is directed at a third field of view that still includes the lamp and the television, but these objects have shifted to the right with respect to the frame of the field of view. To perform this detection, the media guidance application may analyze the image of the third field of view to identify sub-images, identify the objects corresponding to those sub-images, and determine that the same objects are present within the third field of view, but at different locations from their locations in the second field of view. The media guidance application may obtain an image of the third field of view (e.g., via a camera) and analyze (e.g., using an image recognition algorithm as described above) the contents of the third image to determine that the television is within the third field of view. The media guidance application updates the location of "The Oscars are live now!" generated for display to the user such that this statement appears to the user to track the location of the television in the third field of view. The media guidance application may update the location of the visual indication as described above.

The media guidance application may receive a user input indicating a request to display the first media asset of interest to the user. The user input may include a user gesture that can be detected by the supplemental viewing device. For example, if the supplemental viewing device includes an eye tracker, the user input may be an eye movement that is detected by the eye tracker and processed by the media guidance application to determine the command indicated by the eye movement. As another example, if the supplemental viewing device includes an accelerometer or other motion sensor, the user input may be a head movement that is detected by the motion sensor and processed by the media guidance application to determine the command indicated by the motion. As another example, if the supplemental viewing device includes a button, the user input may be a press of the button. As another example, the supplemental viewing device may include a microphone for detecting verbal input from the user, and the media guidance application may identify the words spoken by the user and analyze the identified words to determine that the verbal input indicates a request to display the first media asset of interest. In some embodiments, the user input may be detected by a device other than the supplemental viewing device. For example, the user input may be an indication to play media directed to and received by the media consumption device, by a remote control, by a smartphone, etc. The device that detects the user input may directly respond to the user input and cause the media asset to be presented, or the device may transmit information describing the user input to the media guidance application for processing. In response to receiving the user input, the supplemental viewing device may display the first media asset of interest to the user, or the supplemental viewing device may instruct the media consumption device to present the first media asset of interest to the user.

In some embodiments, the media guidance application may determine the location of the user's gaze after the visual indication 154 has been presented to determine whether the user demonstrates interest in consuming the media asset of interest. The supplemental viewing device may include an eye tracker for tracking the user's gaze point. The media guidance application may receive data from the eye tracker to measure the duration of time that the user's gaze has been focused on the visual indication 154. If the media guidance application determines that the user's gaze has been focused on the visual indication for a threshold period of time, e.g., three seconds, the media guidance application may begin presenting the media asset of interest, or may instruct the television 152 to begin presenting the media asset of interest. Alternatively, if the media guidance application determines that the user's gaze has been focused on the visual indication for a threshold period of time, the media guidance application may display more information describing the media asset of interest, or may display a video preview of the media asset of interest. The video or video preview presented may or may not include sound.

In some embodiments, the media guidance application may determine multiple media assets of interest to the user that are available for consumption via a media consumption device. In such embodiments, the media guidance application residing on the supplemental viewing device 142 may generate a visual indication 154 that identifies more than one of the media assets of interest to the user. For example, the visual indication 154 may include a mosaic of multiple images, each image identifying a different media asset of interest to the user. The different media assets of interest to the user may be available via different sources, e.g., broadcast, DVR recordings, network/cloud recordings, streaming media providers, streaming music providers, etc. If the media guidance application has determined multiple media assets of interest, the media guidance application may permit the user to flick or scroll through the media assets. For example, the media guidance application may, responsive to successive user inputs, cause the display of textual information, still images, video, or video clips of successive media assets determined to be of interest. If the media guidance application displays video or video clips, the media guidance application may or may not cause audio to be played. The media guidance application may receive user input requesting to scroll through the media assets of interest using any of the user input mechanisms described above (i.e., using eye tracking, motion tracking, voice commands, or buttons).

Figure 2:
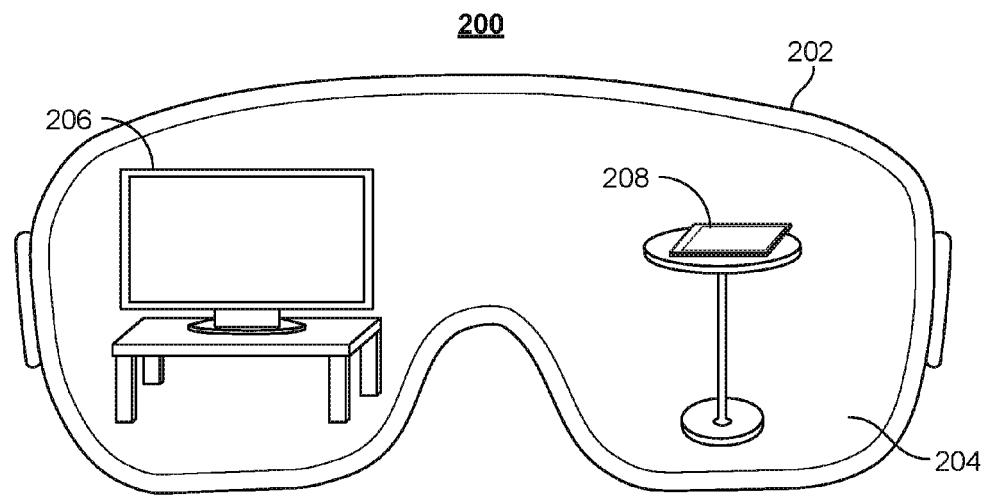
FIG. 2 shows an illustrative example of a supplemental viewing device providing streamlined access to media assets that are of interest to a user, and that are available from various media consumption devices, in accordance with some embodiments of the disclosure.
Figure 2:
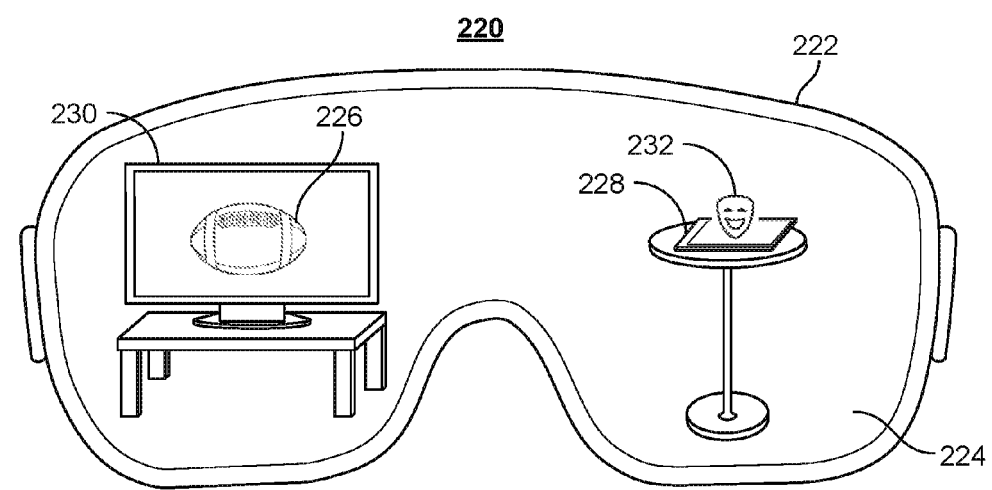

FIG. 2 is an illustrative example of a supplemental viewing device 202 providing streamlined access to media assets that are of interest to a user, and that are available from various media consumption devices 206 and 208. In some embodiments, the media guidance application may determine that a second media consumption device 208 that was not within the first field of view (e.g., field of view 164 in FIG. 1) is within the second field of view 204 and may determine a second media asset of interest to the user that is available for consumption via the second media consumption device 208. The second media asset may be of less interest to the user than the first media asset. The media guidance application residing on the supplemental viewing device may generate a second visual indication in the second field of view 204. The second visual indication may indicate that the second media asset is available for consumption via the second media consumption device (e.g., media consumption device 208), and the visual indication that indicates that the first media asset is available for consumption may be more visually prominent than the second visual indication.

For example, the media guidance application may determine that a tablet computer 208 that was not in the first field of view (e.g., field of view 164 in FIG. 1) is in the second field of view, along with the television 206, which may be the same as television 172. The media guidance application may determine that the latest episode of "Last Week Tonight" is of interest to the user and available for streaming on the tablet computer. The process for identifying a media asset of interest may be similar to the process described with respect to FIG. 1. In this example, a live football game between the New York Jets and the New England Patriots is currently available for viewing on the television 206 and of interest to the user. "Last Week Tonight" may be of less interest to the user than the football game because, for example, the user prefers watching live events to non-live events, or because the user prefers watching football games to comedies. As illustrated in image 220 of FIG. 1, after determining the media assets of interest available on the television 206 and the tablet 208, the supplemental viewing device 222 may generate a football icon 230 in front of the television 226 (which corresponds to television 206) as a first visual indication 230 for the football game, and a comedy icon 232 in front of the tablet 228 (which corresponds to tablet computer 208) as a second visual indication 232 for "Last Week Tonight." The media guidance application may select the icons for the visual indications 230 and 232 by retrieving from a database sets of metadata describing the media assets of interest, extracting a media type (e.g., comedy and football) from each of the sets of metadata, and determining an icon (e.g., the football icon 230 and the comedy mask 232) that corresponds to the extracted media types. The football icon 230 may be more visually prominent than the comedy icon 232 based on, e.g., color, size, brightness, or movement.

In some cases, the same media asset may be available on multiple media consumption devices. For example, "Last Week Tonight" may be available for viewing on both the television 226 and the tablet 228. The media guidance application may retrieve a set of viewing preferences for each media consumption device, rather than retrieving a single set of viewing preferences for the supplemental viewing device, as discussed above. The set of viewing preferences for a particular media consumption device may indicate particular media assets or types of media assets that the user has watched or tends to watch on that media consumption device. For example, the user may tend to watch comedy programs on the tablet 228, and may tend to watch sports programs on the television 226. The media guidance application may then use the different sets of viewing preferences to identify different media assets of interest for each media consumption device. Alternatively, the user profile that is associated with the supplemental viewing device and that includes a set of user preferences may indicate a preferred viewing device for particular media assets or types of media assets, an overall preferred viewing device, and/or a preferred viewing device for a particular media asset or type of media asset. The media guidance application may weigh these user preferences when determining on which device to recommend each media asset. As one example, the media guidance application may determine that "Last Week Tonight" and the Jets game are both available and of interest to the user, and are both available via the television 226 and the tablet 228. The media guidance application may determine that "Last Week Tonight," which the user typically watches on the tablet 228, is of higher overall interest to the user, and may determine that the user's preferred viewing device, based on overall usage, is the television 226. In response to these determinations, the media guidance application may determine to recommend "Last Week Tonight" on the television 226, pairing the media asset of highest interest with the primary viewing device. Alternatively, the media guidance application may determine to recommend "Last Week Tonight" on the tablet 228 because the user typically watches this program on the tablet 228, and recommend the Jets game on the television 226 because the user typically watches sports programs on the television 226. This way, the media guidance application can recommend both media assets on the media consumption device that the user would most likely choose for each media asset.

In some embodiments, the media guidance application may determine a first media type corresponding to the first media asset of interest to the user, and a second media type corresponding to the second media of asset of interest to the user. The second media type may be different from the first media type. The media guidance application may select a first visual property for the visual indication (e.g., visual indication 230) based on the first media asset type, and may select a second visual property for the second visual indication (e.g., visual indication 232) based on the second media asset type. The second visual property may be different from the first visual property. The media guidance application may generate the visual indication (e.g., visual indication 230) and the second visual indication (e.g., visual indication 232) according to the selected first visual property and the selected second visual property.

For example, the media guidance application may determine that the New York Jets football game corresponds to a sports media type, and that "Last Week Tonight" corresponds to a comedy media type. For example, as discussed above, the media guidance application may extract media type data from retrieved metadata describing each of the two media assets. The media guidance application may select one icon shape, such as a football, based on the sports media type, and a different icon shape, such as a comedy mask, based on the comedy media type. The media guidance application may generate the visual indication 230 for the football game according to the selected football icon shape and the visual indication 232 for "Last Week Tonight" based on the comedy mask icon shape.

As illustrated in FIGS. 1 and 2, the visual indications may include words and/or icons. In some embodiments, a visual indication may make a media consumption device appear brighter or highlighted, e.g., in a particular color. For example, the media guidance application may select a particular color by comparing metadata describing the media asset of interest available via a particular media consumption device to data identifying a color that corresponds to the media asset of interest. For example, different categories (e.g., comedy, movies, sports) may correspond to different colors. In some embodiments, the visual indication appears as an outline around the media consumption device. For example, the media guidance application may determine the boundary of the sub-image that corresponds to the media consumption device object, and the media guidance application may generate an outline along the boundary of the sub-image. In some embodiments, the media consumption device may appear to be in motion, or a moving highlight, icon, words, etc., may be displayed by the supplemental viewing device. For example, the media guidance application may continually update the display of the visual indication such that it appears to be in motion. Any of these properties may be used to distinguish between different media consumption devices, or to indicate the particular media asset or the type of media asset available. For example, different types of media assets may be identified using different colors of highlighting or outlining. The supplemental viewing device may augment or alter the field of view in any other way to indicate that a media asset of interest is available via a media consumption device.

The media guidance application may determine that the location of the media consumption device in the second field of view is at or near a perimeter of the second field of view, such that the media consumption device is in the user's peripheral vision. The media guidance application may detect that the supplemental viewing device is now directed at a third field of view. The media guidance application may determine that the location of the media consumption device is not at the perimeter of the third field of view, or appearing within the user's peripheral vision, and the media guidance application may modify the visual indication to identify the first media asset of interest to the user. For example, the media guidance application may first determine that the location of the television in the second field of view is at the perimeter of the second field of view, i.e., near the frame of the field of view. In response to this determination, the media guidance application may generate a first visual indication, such as a glow or highlight superimposed on the television. The glow may be color-coded according to the type of media asset or the expected level of interest of the media asset to the user. For example, the color or brightness of the applied glow may be selected according to a hotness scale in which the color, brightness, and/or other visual features indicate the level of interest to a user. For example, a bright red glow may indicate that the user may be very interested in the first media asset, while a yellow glow may indicate a lower level of expected interest.

The media guidance application may then detect that the supplemental viewing device is now directed at a third field of view, in which the television is now near the center of the third field of view. The media guidance application may determine that the location of the television is not at the perimeter or periphery of the third field of view, and the media guidance application may modify the visual indication so that information identifying the first media asset of interest is displayed. For example, when the location of the television is at the perimeter, the visual indication may cause the television to appear highlighted or glowing, as described above. When the location of the television is not at the perimeter, the visual indication may include the statement "The Oscars are live now!"

In some embodiments, the media guidance application may store data defining a first predefined surface in a physical space accessible to the user, detect that the supplemental viewing device is now directed at a third field of view, obtain a third image of the third field of view, and determine, based on the contents of the third image, that the third field of view includes the first predefined surface. In response to the media guidance application determining that the third field of view includes the first predefined surface, the supplemental viewing device generates a display of information such that the information appears to the user to be displayed on the first predefined surface.

For example, the media guidance data may store data that defines a blank section of a wall in the user's living room. The data may define the section of the wall by one or more dimensions, directions, and/or surrounding objects. The media guidance application may detect that the supplemental viewing device is directed at a third field of view, may obtain a third image of the third field of view, and may determine, based on the third image, that the third field of view includes the predefined surface. For example, the third image may include the predefined surface and surrounding furniture that is known to border the predefined surface. In response to the media guidance application determining that the third field of view includes the predefined surface, the supplemental viewing device may generate a display of information, such as a list of recommended media assets that are currently available for viewing, such that the information appears to the user to be displayed on the first predefined surface.

In some embodiments, the media guidance application may receive a user input indicating a request to display the first media asset of interest to the user, and in response to receiving the user input, the supplemental viewing device displays the first media asset of interest to the user such that the first media asset appears to the user to be displayed on the first predefined surface. For example, rather than view the Oscars ceremony on the television, the user can direct his field of view to the predefined area of the wall and request that the supplemental viewing device display the Oscars ceremony such that it appears to be displayed on the wall. This can make the Oscars ceremony appear to the viewer as larger than it would appear on the television, and, depending on the arrangement of the supplemental viewing device, this can give the user a private view of the Oscars ceremony. For example, the supplemental viewing device may project the media asset of interest (here, the Oscars ceremony) onto a surface of the supplemental viewing device, such that only the user of the supplemental viewing device can see it. Alternatively, if the supplemental viewing device includes a screen, the supplemental viewing device may display the media asset of interest on the screen, such that only the user of the supplemental viewing device can see it. The audio component of the media asset of interest may also be played privately, e.g., at a low volume using speakers of the supplemental viewing device, or on headphones worn by the user of the supplemental viewing device. Alternatively or additionally, the supplemental viewing device may be configured to provide a projection of the media asset of interest onto the predefined surface, and control speakers for playing the audio component of the media asset of interest at a higher volume.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "media consumption device," "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as online applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figures 3, 4:
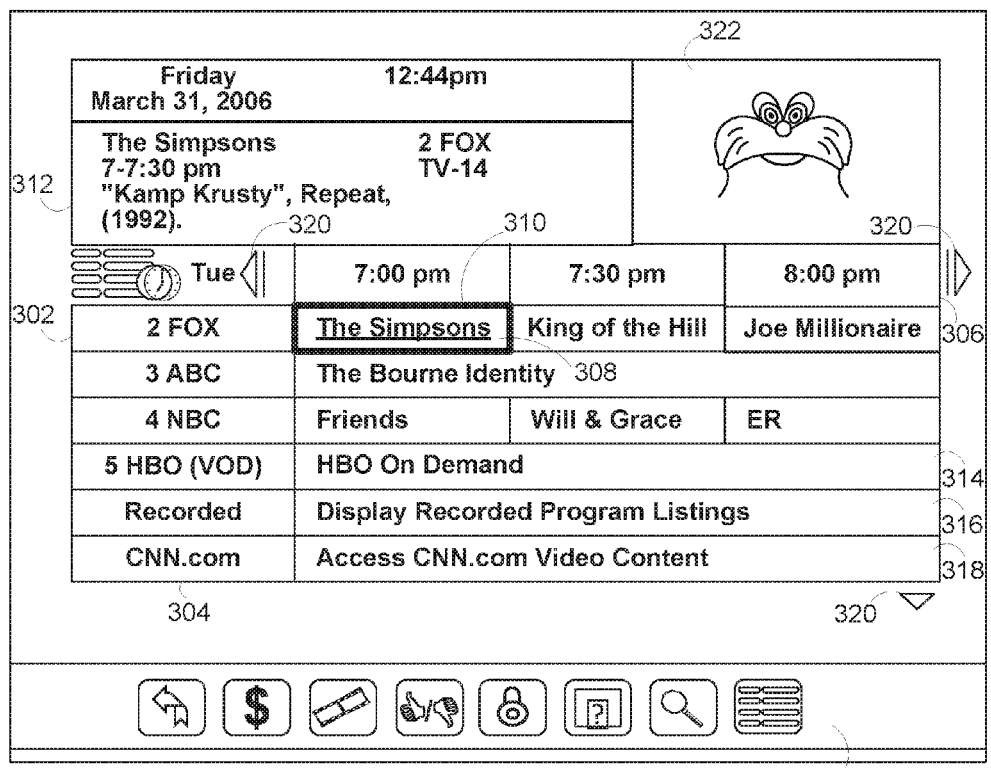
FIG. 3 shows an illustrative example of a display screen generated by a media guidance application, in accordance with some embodiments of the disclosure.
FIG. 4 shows another illustrative example of a display screen generated by a media guidance application, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/

0153885, filed Nov. 12, 2009, which is hereby incorporated by reference herein in its entirety.

Figure 5:
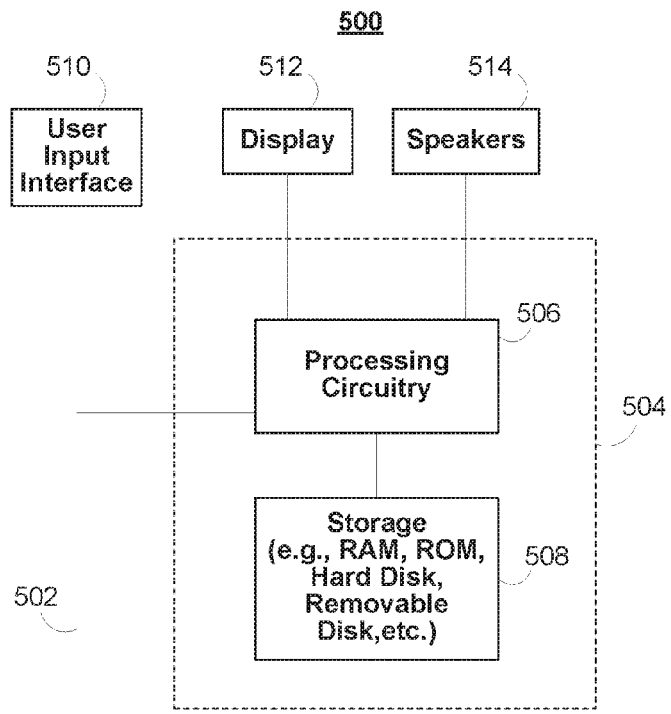
FIG. 5 is a block diagram of an illustrative user equipment device, in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514. In some embodiments, display 512 may be integrated into a virtual reality or augmented reality device, such as supplemental viewing device 102, discussed above with respect to FIG. 1. Display 512 may include any of the display technologies described with respect to FIG. 1.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
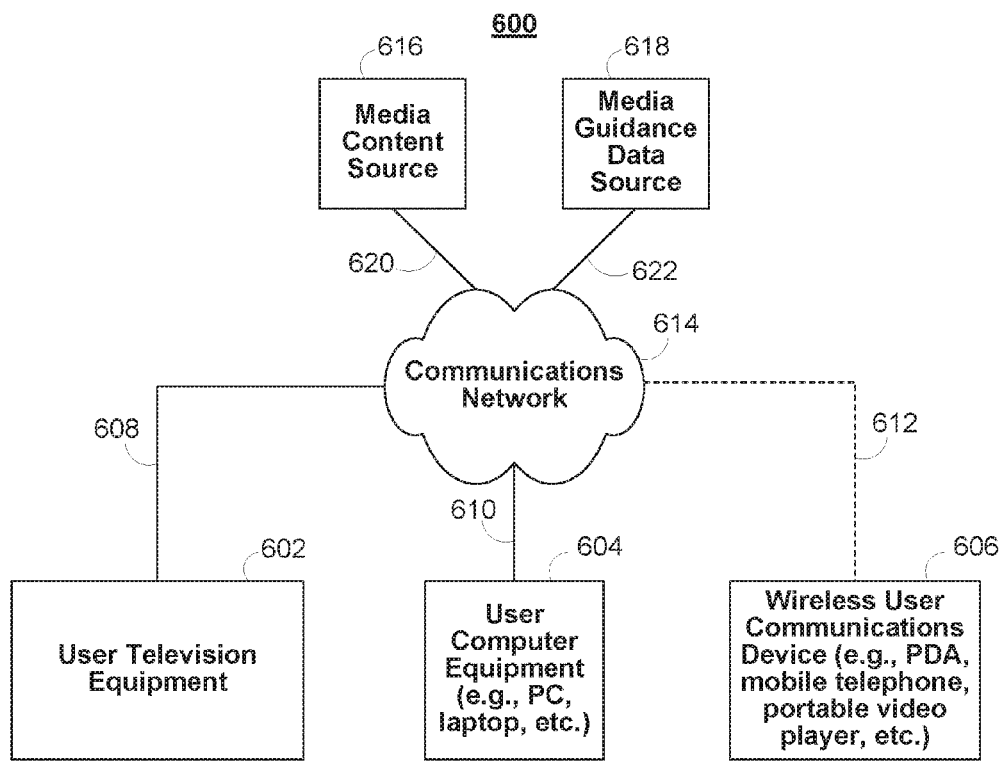
FIG. 6 is a block diagram of an illustrative media system, in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIGS. 7-10 present processes for control circuitry (e.g., control circuitry 504) for providing streamlined access to media assets that are of interest to a user, and that are available from various media consumption devices, in accordance with some embodiments of the disclosure. In some embodiments this algorithm may be encoded on to non-transitory storage medium (e.g., storage device 508) as a set of instructions to be decoded and executed by processing circuitry (e.g., processing circuitry 506). Processing circuitry may in turn provide instructions to other sub-circuits contained within control circuitry 504, such as the tuning, video generating, encoding, decoding, encrypting, decrypting, scaling, analog/digital conversion circuitry, and the like.

Figure 7:
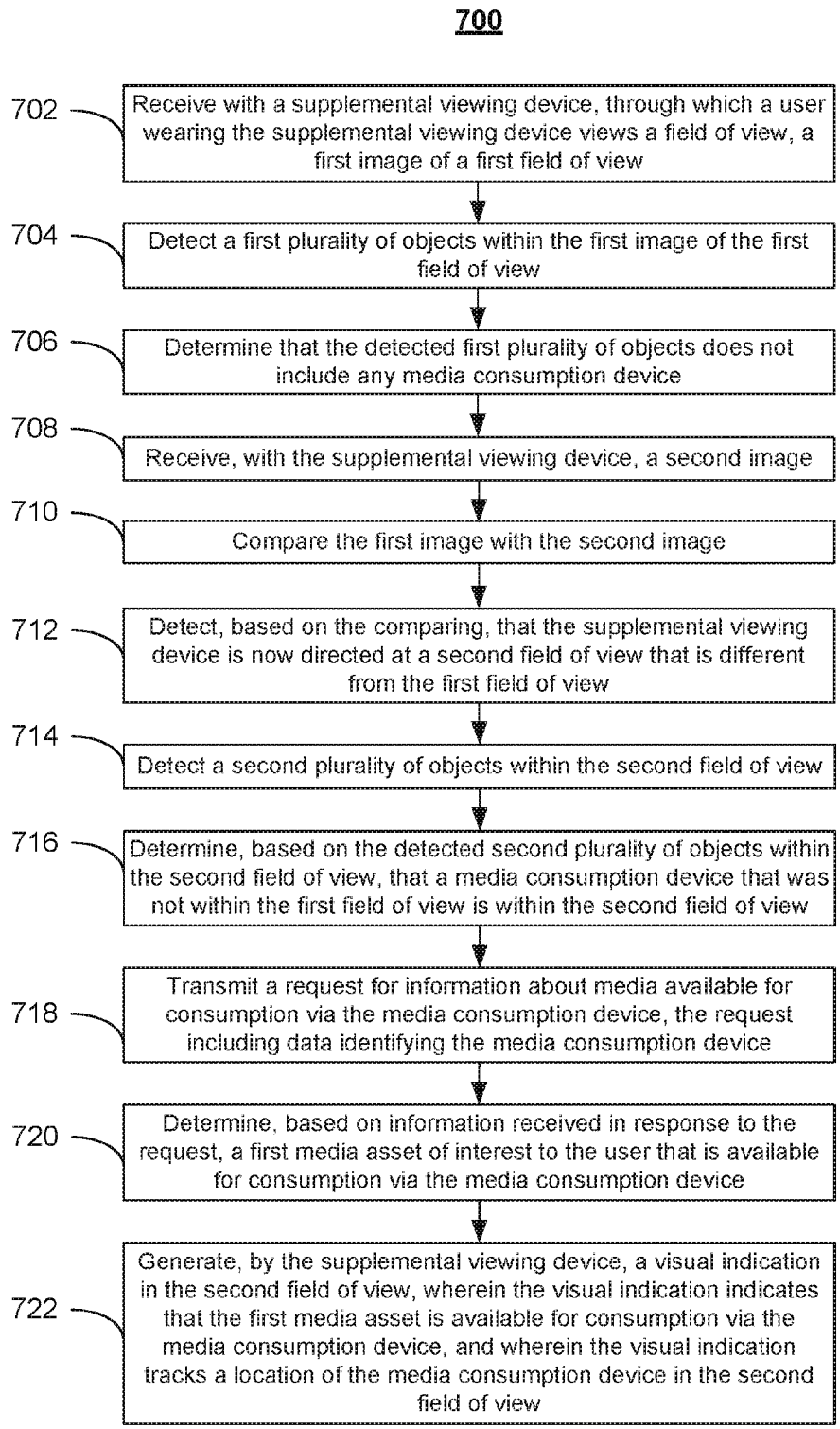
FIG. 7 is a flowchart of illustrative steps involved in providing streamlined access to media assets that are of interest to a user, and that are available from various media consumption devices, in accordance with some embodiments of the disclosure.

FIG. 7 is a flowchart of illustrative steps involved in providing streamlined access to media assets that are of interest to a user, and that are available from various media consumption devices, in accordance with some embodiments of the disclosure. The flowchart in FIG. 7 describes a process 700 implemented on control circuitry (e.g., control circuitry 504). The control circuitry 504 may be acting under commands from the media guidance application, as described above. The elements of process 700 may be performed at the supplemental viewing device, user equipment devices 602, 604, and/or 606, or at the media content source 616, or at a combination of devices and/or sources.

At 702, supplemental viewing device 102, through which a user wearing the supplemental viewing device views a field of view, receives a first image of a first field of view 104. Supplemental viewing devices are described with respect to FIG. 1. As one example, the supplemental viewing device 102 worn by the user may receive an image of the user's living room, which includes a lamp 108 and a table 106. This may be the same image that the user is viewing through the supplemental viewing device. Supplemental viewing device 102 may include a camera for capturing the first image. Supplemental viewing device 102 may also include control circuitry, such as control circuitry 504 described with respect to FIG. 5, for receiving the first image and running a media guidance application. Alternatively, the control circuitry 504 running the media guidance application may be external to the supplemental viewing device 102, or control circuitry 504 may include a combination of local circuitry and external circuitry.

At 704, control circuitry 504 detects a first plurality of objects 106 and 108 within the first image of the first field of view 104. The process of detecting a plurality of objects within the first image is described with respect to FIG. 1.

At 706, control circuitry 504 determines that the detected first plurality of objects 106 and 108 does not include any media consumption device. The process of determining whether the first plurality of objects includes a media consumption device is described with respect to FIG. 1. For example, control circuitry 504 may determine that the lamp 108 and the table 106 are not media consumption devices, and, since there are no other detected objects, the detected objects 106 and 108 do not include any media consumption device.

At 708, supplemental viewing device 122 receives a second image. The process of receiving the second image is described with respect to FIG. 1. For example, supplemental viewing device 122 may capture an image of a different view of the user's living room, which includes the lamp 128 that was detected previously (i.e., the same lamp as lamp 108), along with a different table 130 upon which sits a television 132. The user may have turned his head towards the direction of the television, and this may be the image that the user is now viewing through the supplemental viewing device.

At 710, control circuitry 504 compares the first image with the second image. The process of comparing the first image with the second image is described with respect to FIG. 1. As with the first image, the supplemental viewing device 102 may transmit the second image of the user's living room to internal or external control circuitry 504. For example, control circuitry 504, having received the second image of the user's living room, may compare the first image to the second image to determine whether the image has changed.

At 712, control circuitry 504 detects, based on the comparing, that the supplemental viewing device 122 is now directed at a second field of view 124 that is different from the first field of view 104. Detecting that the supplemental viewing device is now directed at a second field of view that is different from the first field of view is described with respect to FIG. 1. For example, by comparing the first image of the living room, which includes a table 106 and a lamp 108, to the second image of the living room, which includes the same lamp 128 along with a different table 130 and a television 132, control circuitry 504 detects that the supplemental viewing device is now directed at a second field of view 124 that is different from the first 104.

At 714, control circuitry 504 detects a second plurality of objects within the second field of view. Detecting a second plurality of objects within the second field of view is described with respect to FIG. 1 and is described further with respect to FIG. 8. For example, control circuitry 504 may detect the lamp 128, the second table 130, and the television 132 within the second image.

At 716, control circuitry 504 determines, based on the detected second plurality of objects within the second field of view 124, that a media consumption device 132 that was not within the first field of view 104 is within the second field of view 124. Determining that a media consumption device that was not within the first field of view is within the second field of view is described with respect to FIG. 1 and is described further with respect to FIG. 9. For example, control circuitry 504 may determine that the television 132 is a media consumption device that is within the second field of view 124 but was not within the first field of view 104.

At 718, control circuitry 504, in response to determining that the media consumption device 132 that was not within the first field of view 104 is within the second field of view 124, transmits a request for information about media available for consumption via the media consumption device 132. The request may include data identifying the media consumption device. Transmitting a request for information about media available for consumption via the media consumption device is described with respect to FIG. 1. For example, in response to determining that the television 132, which was not within the first field of view 104, is within the second field of view 124, control circuitry 504 may transmit a request for information about the media available for consumption via the television 132. The request may include data identifying the television, such as a serial number or code that corresponds to the television and/or a serial number or code that corresponds to services available via the television (e.g., cable services, satellite services, streaming services, etc.).

At 720, control circuitry 504 determines, based on information received in response to the request, a first media asset of interest to the user that is available for consumption via the media consumption device 132. Determining a first media asset of interest to the user that is available for consumption via the media consumption device is described with respect to FIG. 1 and is described further with respect to FIG. 10. For example, control circuitry 504 may receive information identifying programs that are currently being broadcast to the television 132, and control circuitry 504 may determine that a current broadcast of the Oscars is available for consumption via the television 132 and would be of interest to the user.

At 722, the supplemental viewing device 142 generates a visual indication 154 in the second field of view 144. The supplemental viewing device 142 may generate the visual indication 154 on display 512. The visual indication 154 may indicate that the first media asset is available for consumption via the media consumption device 152, and the visual indication may track a location of the media consumption device in the second field of view, as illustrated in image 160. For example, the supplemental viewing device 142 may generate for display on display 512 the statement "The Oscars are live now!" such that it appears to the user to be on the television screen to indicate that the Oscars are available for consumption via the television. The display of the statement "The Oscars are live now" may track the location of the television in the field of view 144 seen through the supplemental viewing device 142. For example, as the user's head moves but keeps the television 152 within the field of view, the display of "The Oscars are live now!" may move relative to the frame of the field of view 144 of the supplemental viewing device 142, but not move relative to the location of the television 152.

Figure 8:
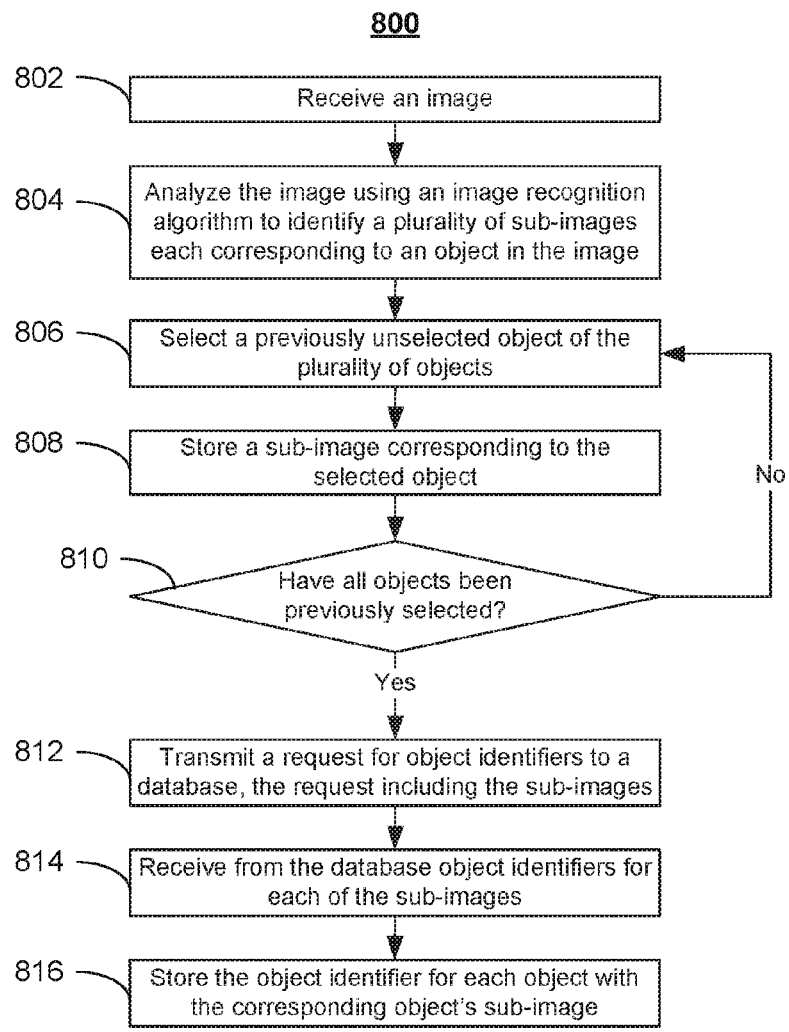
FIG. 8 is a flowchart of illustrative steps involved in detecting a plurality of objects within a field of view, in accordance with some embodiments of the disclosure.

FIG. 8 is a flowchart of illustrative steps involved in detecting a plurality of objects within a field of view, in accordance with some embodiments of the disclosure. The flowchart in FIG. 8 describes a process 800 implemented on control circuitry (e.g., control circuitry 504). The control circuitry 504 may be acting under commands from the media guidance application, as described above. The elements of process 800 may be performed at the supplemental viewing device, user equipment devices 602, 604, and/or 606, or at the media content source 616, or at a combination of devices and/or sources.

At 802, control circuitry 504 receives an image. For example, control circuitry 504 may receive an image of field of view 124.

At 804, control circuitry 504 analyzes the image using an image recognition algorithm to identify a plurality of sub-images each corresponding to an object in the image. Using an image recognition algorithm to identify a plurality of sub-images is described with respect to FIG. 1. For example, control circuitry 504 may include an image recognition algorithm that analyzes the second image of the field of view 124 to identify a sub-image corresponding to the lamp 128, a sub-image corresponding to the television 132, and a sub-image corresponding to the table 130.

At 806, control circuitry 504 selects a previously unselected object of the plurality of objects. For example, if the lamp 128 has not been selected, control circuitry 504 may select lamp 128.

At 808, control circuitry 504 stores a sub-image corresponding to the selected object. For example, if control circuitry 504 has selected the lamp 128, control circuitry 504 may store the sub-image corresponding to the lamp 128.

At 810, control circuitry 504 determines whether all objects have been previously selected. If control circuitry 504 determines that one or more objects have not been previously selected, control circuitry 504 loops back to action 806. For example, if the television 132 has not been previously selected, control circuitry 504 returns to 806, and then, at 808, stores the sub-image corresponding to the television 132. If control circuitry 504 determines that all objects (e.g., objects 128, 130, and 132 in field of view 124) have been previously selected, control circuitry 504 proceeds to action 812.

At 812, control circuitry 504 transmits a request for object identifiers to a database, the request including the sub-images. Control circuitry 504 may transmit the request via communications network 614. Transmitting the request for object identifiers to a database, and the structure of the database, are described with respect to FIG. 1. For example, control circuitry 504 may transmit the lamp, television, and table sub-images via communications network 614 to a database that stores information correlating sub-images of various objects to identifiers of the objects.

At 814, control circuitry 504 receives from the database object identifiers for each of the sub-images. Receiving from the database object identifiers for each of the sub-images is described with respect to FIG. 1. For example, control circuitry 504 may receive from the database via communications network 614 object identifiers that identify the lamp 128, television 132, and table 130. For example, the object identifiers may include serial numbers or other data codes.

At 816, control circuitry 504 stores the object identifier for each object with the corresponding object's sub-image. Storing the object identifier for each object with the corresponding object's sub-image is described with respect to FIG. 1. For example, control circuitry 504 may store the received object identifiers identifying the lamp 128, television 132, and table 130, e.g., in local memory (e.g., storage device 508).

Figure 9:
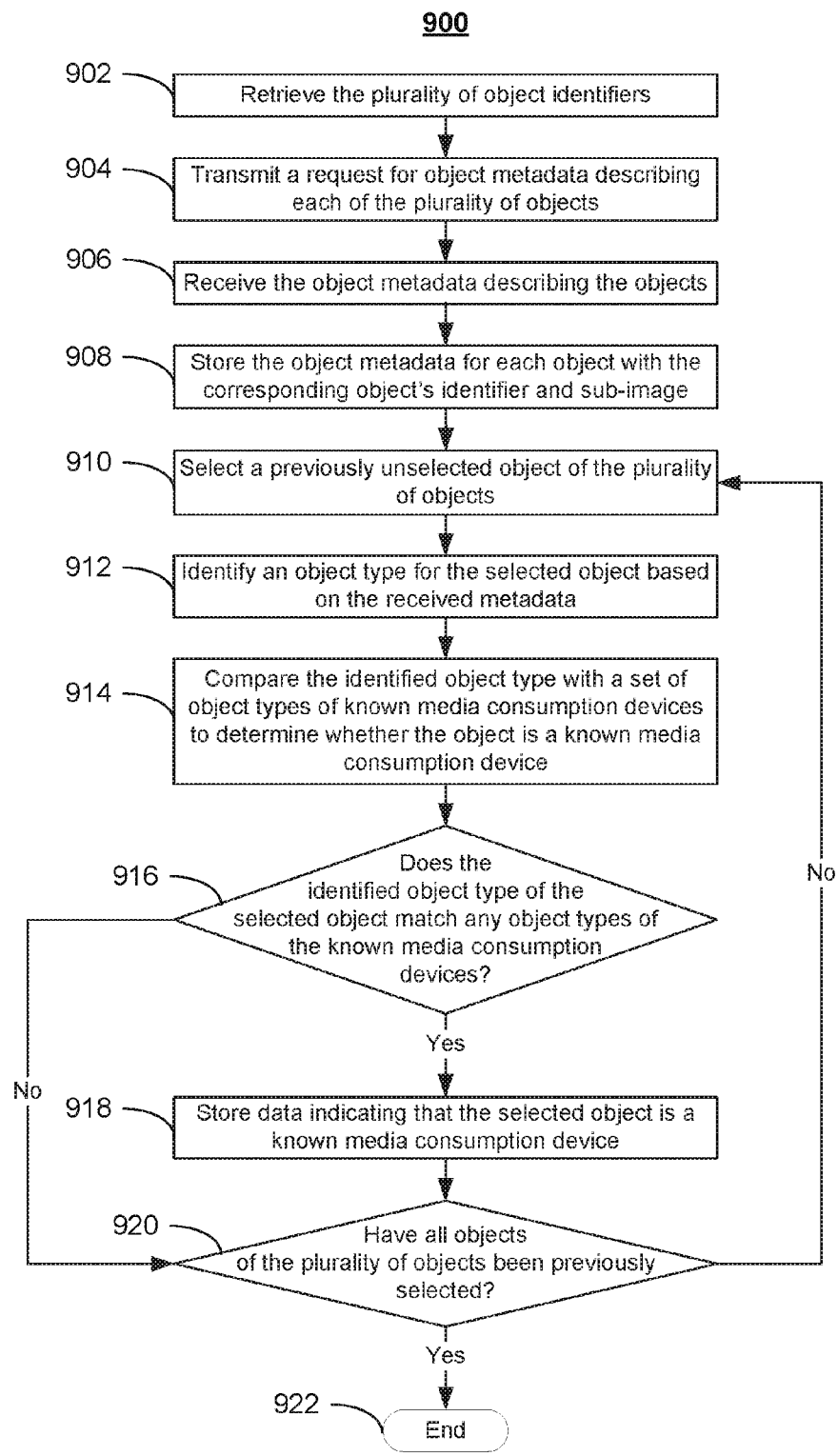
FIG. 9 is a flowchart of illustrative steps for determining that a media consumption device that was not within a first field of view is within a second field of view, in accordance with some embodiments of the disclosure.

FIG. 9 is a flowchart of illustrative steps for determining that a media consumption device that was not within a first field of view is within a second field of view, in accordance with some embodiments of the disclosure. The flowchart in FIG. 9 describes a process 900 implemented on control circuitry (e.g., control circuitry 504). The control circuitry 504 may be acting under commands from the media guidance application, as described above. The elements of process 900 may be performed at the supplemental viewing device, user equipment devices 602, 604, and/or 606, or at the media content source 616, or at a combination of devices and/or sources.

At 902, control circuitry 504 retrieves the plurality of object identifiers. Retrieving the plurality of object identifiers is described with respect to FIG. 1. For example, control circuitry 504 may retrieve (e.g., from storage device 508) the object identifiers for the lamp 128, television 132, and table 130 that were stored at 816.

At 904, control circuitry 504 transmits a request for object metadata describing each of the plurality of objects. Transmitting a request for object metadata describing each of the plurality of objects is described with respect to FIG. 1. For example, control circuitry 504 may transmit a request via communications network 514 for object metadata describing the lamp 128, television 132, and table 130. The request may include the object identifiers, which may be, e.g., serial numbers or other data codes.

At 906, control circuitry 504 receives the object metadata describing the objects. Receiving the object metadata describing the objects is described with respect to FIG. 1. For example, control circuitry 504 may receive via communications network 514 object metadata describing the lamp 128, television 132, and table 130. For example, the metadata describing the table 130 may include the brand name "IKEA," the model name "LACK," the color "brown," and the type "table." The metadata describing the television 132 may include the brand "SAMSUNG," the model number "5200," and the type "Living Room Smart TV."

At 908, control circuitry 504 stores (e.g., in storage device 508) the object metadata for each object with the corresponding object's identifier and sub-image. For example, control circuitry 504 may store the brand "SAMSUNG," the model number "5200," and the type "Living Room Smart TV" in the same data structure in which the object identifier and sub-image of television 132 are stored.

At 910, control circuitry 504 selects a previously unselected object of the plurality of objects. For example, if the lamp 128 has not been selected, control circuitry 504 may select lamp 128. Alternatively, or in another iteration of the loop that follows action 910, if the television 132 has not been selected, control circuitry 504 may select television 132.

At 912, control circuitry 504 identifies an object type for the selected object based on the received metadata. Identifying object types for selected objects is described with respect to FIG. 1. For example, if control circuitry 504 selected the television 132 at 910, control circuitry 504 may identify a type corresponding to the television 132, such as the type "Living Room Smart TV."

At 914, control circuitry 504 compares the identified object type with a set of object types of known media consumption devices to determine whether the object is a known media consumption device. Comparing the identified object type with a set of object types of known media consumption devices to determine whether the object is a known media consumption device is described with respect to FIG. 1. For example, control circuitry 504 may compare, for the type "Living Room Smart TV" corresponding to the table 132 with a plurality of types each corresponding to a known media consumption device, such as "Living Room Smart TV," "IPAD," "Bedroom TV," etc.

At 916, control circuitry 504 determines whether the identified object type of the selected object matches any object types of the known media consumption devices. Determining whether the identified object type of the selected object matches any object types of the known media consumption devices is described with respect to FIG. 1. For example, control circuitry 504 may determine that the identified object type "Living Room Smart TV" of the selected object table 132 matches an object type of the known media consumption types, which include "Living Room Smart TV." If control circuitry 504 determines that the identified object type of the selected object type matches an object type of the known media consumption devices, control circuitry 504 proceeds to action 918. If control circuitry 504 determines that the identified object type of the selected object type does not match an object type of the known media consumption devices, control circuitry 504 skips action 918 and proceeds to action 920. Alternatively, if control circuitry 504 determines that the identified object type of the selected object type does not match an object type of the known media consumption devices, control circuitry 504 may store data indicating that the selected object is not a known media consumption device before proceeding to action 920.

At 918, control circuitry 504 stores (e.g., in storage device 508) data indicating that the selected object is a known media consumption device. For example, control circuitry 504 may store data indicating that the selected object table 132 is a known media consumption device.

At 920, control circuitry 504 determines whether all objects of the plurality of objects have been previously selected. If control circuitry 504 determines that one or more objects have not been previously selected, control circuitry 504 loops back to action 910. For example, if the table 130 has not been previously selected, control circuitry 504 returns to 910. If control circuitry 504 determines that all objects (e.g., objects 128, 130, and 132 in field of view 124) have been previously selected, control circuitry 504 proceeds to action 922.

At 922, control circuitry 504 ends process 900. Control circuitry 504 may proceed to action 718 in FIG. 7.

Figure 10:
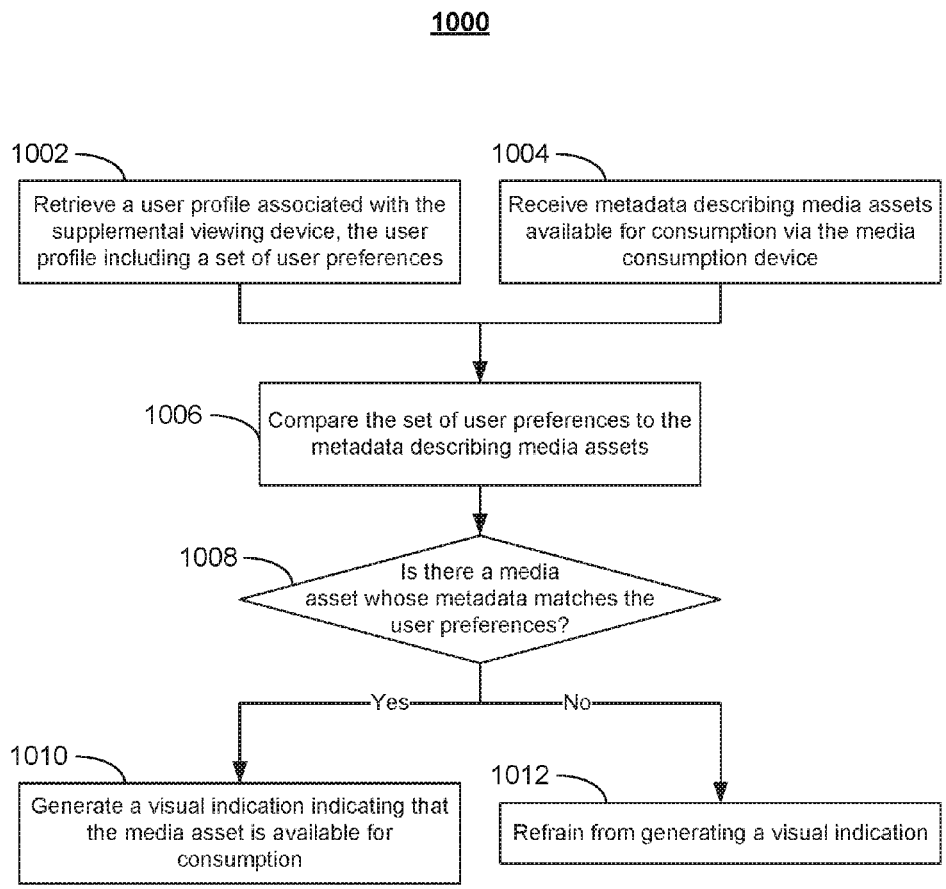
FIG. 10 is a flowchart of illustrative steps for determining a first media asset of interest to the user that is available for consumption via a media consumption device, in accordance with some embodiments of the disclosure.

FIG. 10 is a flowchart of illustrative steps for determining a first media asset of interest to the user that is available for consumption via a media consumption device, in accordance with some embodiments of the disclosure. The flowchart in FIG. 10 describes a process 1000 implemented on control circuitry (e.g., control circuitry 504). The control circuitry 504 may be acting under commands from the media guidance application, as described above. The elements of process 1000 may be performed at the supplemental viewing device, user equipment devices 602, 604, and/or 606, or at the media content source 616, or at a combination of devices and/or sources.

At 1002, control circuitry 504 retrieves a user profile associated with the supplemental viewing device, the user profile including a set of user preferences. Retrieving a user profile associated with the supplemental viewing device, the user profile including a set of user preferences is described with respect to FIG. 1. For example, control circuitry 504 may retrieve a user profile that is associated with the supplemental viewing device 124 and that includes a set of user preferences, such as interests in movies, game shows, the New York Jets, and award shows. Control circuitry 504 may retrieve the user profile from storage 508 or from an external database via communications network 614.

At 1004, control circuitry 504 receives metadata describing media assets available for consumption via the media consumption device. Receiving metadata describing media assets available for consumption via the media consumption device is described with respect to FIG. 1. For example, control circuitry 504 may receive, in response to a request for information about the media available for consumption via the television 132, metadata describing all broadcast programs currently available to view on the television 132. Control circuitry 504 may receive the metadata describing the programs from storage 508, or from media guidance data source 618 via communications network 614.

At 1006, control circuitry 504 compares the set of user preferences to the metadata describing media assets. Determining whether there is a media asset whose metadata matches the user preferences is described with respect to FIG. 1. For example, control circuitry 504 may compare the set of user preferences, which includes the user's interests in movies, game shows, the New York Jets, and award shows, with the metadata describing broadcast programs currently available to view on the television 132. For example, metadata describing the Oscars ceremony, which may be currently available to view on the television 132, may indicate that it is about movies, is live, includes Jimmy Kimmel, and is an awards show.

At 1008, control circuitry 504 determines whether there is a media asset whose metadata matches the user preferences. Determining whether there is a media asset whose metadata matches the user preferences is described with respect to FIGS. 1 and 2. For example, based on the comparison of the user preferences of movies, game shows, the New York Jets, and award shows to metadata for the Oscars ceremony, which is about movies, is live, includes Jimmy Kimmel, and is an awards show, control circuitry 504 may determine that the metadata of the Oscars ceremony matches the user preferences and is of interest to the user. In particular, the metadata of the Oscars ceremony matches two user preferences (movies, award shows) of the set of user preferences.

At 1010, supplemental viewing device 142 generates a visual indication indicating that the media asset is available for consumption. Generating a visual indication indicating that the media asset is available for consumption is described with respect to FIGS. 1 and 2. For example, the supplemental viewing device 142 may generate for display on display 512 the statement "The Oscars are live now!" such that it appears to the user to be on the television screen to indicate that the Oscars are available for consumption via the television 152.

At 1012, control circuitry 504 refrains from generating a visual indication. For example, if none of the available media assets matches the user preferences, control circuitry 504 does not generate a visual indication.

It is contemplated that the descriptions of FIGS. 7-10 may be used with any other embodiment of this disclosure. In addition, the descriptions described in relation to the algorithms of FIGS. 7-10 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments several instances of a variable may be evaluated in parallel, using multiple logical processor threads, or the algorithm may be enhanced by incorporating branch prediction. Furthermore, it should be noted that the processes of FIGS. 7-10 may be implemented on a combination of appropriately configured software and hardware, and that any of the devices or equipment discussed in relation to FIGS. 5-6 could be used to implement one or more portions of the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing a media asset recommendation using a supplemental viewing device, the method comprising:
    receiving with a supplemental viewing device, through which a user wearing the supplemental viewing device views a field of view, a first image of a first field of view;
    detecting a first plurality of objects within the first image of the first field of view;
    determining that the detected first plurality of objects does not include any media consumption device;
    receiving, with the supplemental viewing device, a second image;
    comparing the first image with the second image;
    detecting, based on the comparing, that the supplemental viewing device is now directed at a second field of view that is different from the first field of view;
    detecting a second plurality of objects within the second field of view;
    determining, based on the detected second plurality of objects within the second field of view, that a media consumption device that was not within the first field of view is within the second field of view; and
    in response to determining that the media consumption device that was not within the first field of view is within the second field of view:
        transmitting a request for information about media available for consumption via the media consumption device, the request including data identifying the media consumption device;
        determining, based on information received in response to the request, a first media asset of interest to the user that is available for consumption via the media consumption device; and
        generating, by the supplemental viewing device, a visual indication in the second field of view, wherein the visual indication indicates that the first media asset is available for consumption via the media consumption device, and wherein the visual indication tracks a location of the media consumption device in the second field of view.

2. The method of claim 1, wherein detecting a second plurality of objects within the second field of view comprises:
    analyzing the second image, using an image recognition algorithm, to identify a plurality of sub-images, wherein each sub-image of the plurality of sub-images corresponds to an object within the first image;
    transmitting the plurality of sub-images to a database;
    receiving, from the database, a plurality of object identifiers identifying the second plurality of objects, each of the plurality of object identifiers corresponding to a respective sub-image of the plurality of sub-images; and
    storing the received plurality of object identifiers.

3. The method of claim 2, wherein determining that a media consumption device that was not within the first field of view is within the second field of view comprises:
    retrieving the plurality of object identifiers;
    transmitting a request for object metadata describing each of the second plurality of objects, the request including the plurality of object identifiers;
    receiving object metadata describing each of the second plurality of objects;
    identifying, based on the received object metadata, a type corresponding to each object of the second plurality of objects;
    comparing, for each of the plurality of objects, the type corresponding to each object with a plurality of types each corresponding to a known media consumption device; and
    based on comparing, for each of the plurality of objects, the type corresponding to each object with the plurality of types, determining that the second plurality of objects includes the media consumption device.

4. The method of claim 1 wherein determining a first media asset of interest to the user that is available for consumption via the media consumption device comprises:
    receiving, in response to the request, metadata describing a plurality of media assets available for consumption via the media consumption device;
    retrieving a user profile associated with the supplemental viewing device, the user profile including a set of user preferences;
    comparing the set of user preferences with the metadata describing the plurality of media assets available via the media consumption device; and
    identifying, based on comparing the set of user preferences with the metadata describing the plurality of media assets available via the media consumption device, the first media asset of interest to the user, wherein the metadata describing the first media asset of interest to the user matches at least one user preference of the set of user preferences.

5. The method of claim 1 further comprising:
    determining that a second media consumption device that was not within the first field of view is within the second field of view;
    determining a second media asset of interest to the user that is available for consumption via the second media consumption device, wherein the second media asset is of less interest to the user than the first media asset; and
    generating, by the supplemental viewing device, a second visual indication in the second field of view, wherein the second visual indication indicates that the second media asset is available for consumption via the second media consumption device, and wherein the visual indication that indicates that the first media asset is available for consumption is more visually prominent than the second visual indication.

6. The method of claim 5 further comprising:
    determining a first media type corresponding to the first media asset of interest to the user;
    determining a second media type corresponding to the second media of asset of interest to the user, wherein the second media type is different from the first media type;
    selecting a first visual property for the visual indication based on the first media asset type; and selecting a second visual property for the second visual indication based on the second media asset type, wherein the second visual property is different from the first visual property; and generating the visual indication and the second visual indication according to the selected first visual property and the selected second visual property.

7. The method of claim 1 further comprising:
detecting that the supplemental viewing device is now directed at a third field of view;
obtaining a third image of the third field of view;
analyzing the contents of the obtained third image to determine that the media consumption device is within the third field of view; and
updating the location of the visual indication such that the visual indication appears to the user to track the location of the media consumption device in the third field of view.

8. The method of claim 1 further comprising:
determining that the location of the media consumption device in the second field of view is at a perimeter of the second field of view;
detecting that the supplemental viewing device is now directed at a third field of view;
determining that the location of the media consumption device is not at the perimeter of the third field of view; and
modifying the visual indication to identify the first media asset of interest to the user.

9. The method of claim 1 further comprising:
storing data defining a first predefined surface in a physical space accessible to the user;
detecting that the supplemental viewing device is now directed at a third field of view;
obtaining a third image of the third field of view;
determining, based on the contents of the third image, that the third field of view includes the first predefined surface; and
in response to determining that the third field of view includes the first predefined surface, generating, by the supplemental viewing device, a display of information such that the information appears to the user to be displayed on the first predefined surface.

10. The method of claim 9 further comprising:
receiving a user input indicating a request to display the first media asset of interest to the user; and
in response to receiving the user input, displaying, by the supplemental viewing device, the first media asset of interest to the user such that the first media asset appears to the user to be displayed on the first predefined surface.

11. A system for providing a media asset recommendation using a supplemental viewing device, the system comprising:
a supplemental viewing device, through which a user wearing the supplemental viewing device views a field of view, configured to:
receive a first image of a first field of view;
receive a second image of a second field of view; and
generate a visual indication in the second field of view, wherein the visual indication indicates that a first media asset is available for consumption via a media consumption device, and wherein the visual indication tracks a location of the media consumption device in the second field of view; and control circuitry configured to:
detect a first plurality of objects within the first image of the first field of view;
determine that the detected first plurality of objects does not include any media consumption device;
compare the first image with the second image;
detect, based on the comparing, that the supplemental viewing device is now directed at the second field of view that is different from the first field of view;
detect a second plurality of objects within the second field of view;
determine, based on the detected second plurality of objects within the second field of view, that the media consumption device that was not within the first field of view is within the second field of view;
transmit a request for information about media available for consumption via the media consumption device, the request including data identifying the media consumption device; and
determine, based on information received in response to the request, the first media asset of interest to the user that is available for consumption via the media consumption device.

12. The system of claim 11, wherein the control circuitry is configured, when detecting a second plurality of objects within the second field of view, to:
analyze the second image, using an image recognition algorithm, to identify a plurality of sub-images, wherein each sub-image of the plurality of sub-images corresponds to an object within the first image;
transmit the plurality of sub-images to a database;
receive, from the database, a plurality of object identifiers identifying the second plurality of objects, each of the plurality of object identifiers corresponding to a respective sub-image of the plurality of sub-images; and
store the received plurality of object identifiers.

13. The system of claim 12, wherein the control circuitry is configured, when determining that the media consumption device that was not within the first field of view is within the second field of view, to:
retrieve the plurality of object identifiers;
transmit a request for object metadata describing each of the second plurality of objects, the request including the plurality of object identifiers;
receive object metadata describing each of the second plurality of objects;
identify, based on the received object metadata, a type corresponding to each object of the second plurality of objects;
compare, for each of the plurality of objects, the type corresponding to each object with a plurality of types each corresponding to a known media consumption device; and
based on comparing, for each of the plurality of objects, the type corresponding to each object with the plurality of types, determine that the second plurality of objects includes the media consumption device.

14. The system of claim 11 wherein the control circuitry is configured, when determining a first media asset of interest to the user that is available for consumption via the media consumption device, to:
receive, in response to the request, metadata describing a plurality of media assets available for consumption via the media consumption device;
retrieve a user profile associated with the supplemental viewing device, the user profile including a set of user preferences;

compare the set of user preferences with the metadata describing the plurality of media assets available via the media consumption device; and identify, based on comparing the set of user preferences with the metadata describing the plurality of media assets available via the media consumption device, the first media asset of interest to the user, wherein the metadata describing the first media asset of interest to the user matches at least one user preference of the set of user preferences.

15. The system of claim 11 wherein the control circuitry is further configured to:

determine that a second media consumption device that was not within the first field of view is within the second field of view;

determine a second media asset of interest to the user that is available for consumption via the second media consumption device, wherein the second media asset is of less interest to the user than the first media asset; and generate, by the supplemental viewing device, a second visual indication in the second field of view, wherein the second visual indication indicates that the second media asset is available for consumption via the second media consumption device, and wherein the visual indication that indicates that the first media asset is available for consumption is more visually prominent than the second visual indication.

16. The system of claim 15 wherein the control circuitry is further configured to:

determine a first media type corresponding to the first media asset of interest to the user;

determine a second media type corresponding to the second media of asset of interest to the user, wherein the second media type is different from the first media type;

select a first visual property for the visual indication based on the first media asset type; and select a second visual property for the second visual indication based on the second media asset type, wherein the second visual property is different from the first visual property; and generate the visual indication and the second visual indication according to the selected first visual property and the selected second visual property.

17. The system of claim 11 wherein the control circuitry is further configured to:

detect that the supplemental viewing device is now directed at a third field of view;

obtain a third image of the third field of view;

analyze the contents of the obtained third image to determine that the media consumption device is within the third field of view; and update the location of the visual indication such that the visual indication appears to the user to track the location of the media consumption device in the third field of view.

18. The system of claim 11 wherein the control circuitry is further configured to:

determine that the location of the media consumption device in the second field of view is at a perimeter of the second field of view;

detect that the supplemental viewing device is now directed at a third field of view;

determine that the location of the media consumption device is not at the perimeter of the third field of view; and modify the visual indication to identify the first media asset of interest to the user.

19. The system of claim 11 wherein the control circuitry is further configured to:

store data defining a first predefined surface in a physical space accessible to the user;

detect that the supplemental viewing device is now directed at a third field of view;

obtain a third image of the third field of view; and determine, based on the contents of the third image, that the third field of view includes the first predefined surface; and wherein the supplemental viewing device is further configured to:

generate a display of information such that the information appears to the user to be displayed on the first predefined surface.

20. The system of claim 19 wherein the control circuitry is further configured to receive a user input indicating a request to display the first media asset of interest to the user, and wherein the supplemental viewing device is further configured to display the first media asset of interest to the user such that the first media asset appears to the user to be displayed on the first predefined surface.

* * * * *